United States Patent
Chaves et al.

(10) Patent No.: US 12,488,682 B2
(45) Date of Patent: Dec. 2, 2025

(54) MESSAGE BROADCASTING FOR VEHICLES

(71) Applicant: QUALCOMM Incorporated, San Diego, CA (US)

(72) Inventors: Stephen Marc Chaves, Philadelphia, PA (US); Daniel Warren Mellinger, III, Raleigh, NC (US); Paul Daniel Martin, Devon, PA (US); Michael Joshua Shomin, Philadelphia, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/340,294

(22) Filed: Jun. 23, 2023

(65) Prior Publication Data

US 2023/0334983 A1 Oct. 19, 2023

Related U.S. Application Data

(63) Continuation of application No. 16/439,956, filed on Jun. 13, 2019, now abandoned.

(60) Provisional application No. 62/782,573, filed on Dec. 20, 2018.

(51) Int. Cl.
*G08G 1/01* (2006.01)
*G08G 1/16* (2006.01)

(52) U.S. Cl.
CPC ......... *G08G 1/0141* (2013.01); *G08G 1/0112* (2013.01); *G08G 1/162* (2013.01); *G08G 1/166* (2013.01)

(58) Field of Classification Search
None
See application file for complete search history.

(56) References Cited

U.S. PATENT DOCUMENTS

| | | | |
|---|---|---|---|
| 6,720,920 B2 | 4/2004 | Breed et al. | |
| 6,861,957 B2 | 3/2005 | Koike | |
| 7,889,065 B2 | 2/2011 | Smith et al. | |
| 8,520,695 B1* | 8/2013 | Rubin | H04W 72/30 370/445 |
| 8,532,862 B2 | 9/2013 | Neff | |
| 8,700,251 B1* | 4/2014 | Zhu | B60W 60/00276 701/25 |
| 9,600,768 B1* | 3/2017 | Ferguson | G06N 5/02 |
| 9,864,064 B2 | 1/2018 | Ishigami et al. | |

(Continued)

FOREIGN PATENT DOCUMENTS

| | | |
|---|---|---|
| CN | 101526615 A | 9/2009 |
| CN | 102963355 A | 3/2013 |

(Continued)

OTHER PUBLICATIONS

Alonso J., et al., "Autonomous Vehicle Control Systems for Safe Crossroads," 2011, 16 pages.

(Continued)

*Primary Examiner* — Aniss Chad
*Assistant Examiner* — Christopher George Fees
(74) *Attorney, Agent, or Firm* — Muncy, Geissler, Olds & Lowe, P.C.

(57) ABSTRACT

Various aspects may include methods enabling a vehicle to broadcast intentions and/or motion plans to surrounding vehicles. Various aspects include methods for using intentions and/or motion plans received from one or more surrounding vehicles.

30 Claims, 12 Drawing Sheets

(56) References Cited

U.S. PATENT DOCUMENTS

| | | | |
|---|---|---|---|
| 10,037,696 B2 | 7/2018 | Laur et al. | |
| 10,098,014 B1* | 10/2018 | Shimizu | H04W 4/80 |
| 10,440,668 B1* | 10/2019 | Wu | H04W 4/46 |
| 11,054,834 B2* | 7/2021 | Russell | G05D 1/0088 |
| 11,906,625 B2* | 2/2024 | Rangesh | G06T 7/70 |
| 2007/0162550 A1* | 7/2007 | Rosenberg | H04L 51/04 |
| | | | 709/206 |
| 2010/0256852 A1* | 10/2010 | Mudalige | G08G 1/164 |
| | | | 701/24 |
| 2013/0278769 A1 | 10/2013 | Nix et al. | |
| 2013/0279393 A1 | 10/2013 | Rubin et al. | |
| 2015/0161894 A1* | 6/2015 | Duncan | B60W 30/00 |
| | | | 701/1 |
| 2016/0358477 A1 | 12/2016 | Ansari | |
| 2017/0003136 A1 | 1/2017 | Barnard et al. | |
| 2017/0031361 A1* | 2/2017 | Olson | B60W 40/10 |
| 2018/0056998 A1 | 3/2018 | Benosman et al. | |
| 2018/0067495 A1* | 3/2018 | Oder | G06V 20/56 |
| 2018/0148051 A1* | 5/2018 | Lujan | B60W 30/18154 |
| 2018/0208195 A1 | 7/2018 | Hutcheson et al. | |
| 2018/0257645 A1* | 9/2018 | Buburuzan | B60W 30/0956 |
| 2018/0319403 A1* | 11/2018 | Buburuzan | G08G 1/162 |
| 2019/0005812 A1 | 1/2019 | Matus et al. | |
| 2019/0035275 A1 | 1/2019 | Nishi | |
| 2019/0061712 A1* | 2/2019 | Melik-Barkhudarov | |
| | | | B60T 8/172 |
| 2019/0236955 A1* | 8/2019 | Hu | G08G 1/096741 |
| 2019/0266498 A1 | 8/2019 | Maluf et al. | |
| 2019/0339082 A1* | 11/2019 | Doig | G01C 21/3848 |
| 2020/0003861 A1* | 1/2020 | Eriksson | G01S 5/0289 |
| 2020/0097841 A1 | 3/2020 | Petousis et al. | |
| 2020/0202706 A1 | 6/2020 | Chaves et al. | |
| 2021/0067926 A1* | 3/2021 | Hwang | H04W 4/44 |

FOREIGN PATENT DOCUMENTS

| | | |
|---|---|---|
| CN | 103646298 A | 3/2014 |
| CN | 104167097 B | 5/2016 |
| CN | 106128137 A | 11/2016 |
| CN | 106428009 A | 2/2017 |
| CN | 106485949 A | 3/2017 |
| CN | 106781551 A | 5/2017 |
| CN | 107146408 A | 9/2017 |
| CN | 107155407 A | 9/2017 |
| CN | 107561969 A | 1/2018 |
| CN | 107284452 B | 4/2018 |
| CN | 108027243 A | 5/2018 |
| CN | 105761546 B | 6/2018 |
| CN | 108349496 A | 7/2018 |
| CN | 108564234 A | 9/2018 |
| CN | 109017782 A | 12/2018 |
| CN | 109035862 A | 12/2018 |
| CN | 109863500 A | 6/2019 |
| CN | 109920246 A | 6/2019 |
| CN | 113228129 B | 5/2023 |
| DE | 102009035072 A1 | 2/2011 |
| DE | 102015220481 A1 | 5/2017 |
| EP | 1459977 A1 | 9/2004 |
| EP | 3021305 A2 | 5/2016 |
| EP | 3121762 A1 | 1/2017 |
| EP | 3364393 A1 | 8/2018 |
| JP | 2003228800 A | 8/2003 |
| JP | 2007094698 A | 4/2007 |
| JP | 2010019588 A | 1/2010 |
| JP | 2012112691 A | 6/2012 |

OTHER PUBLICATIONS

International Preliminary Report on Patentability—PCT/US2019/058460, The International Bureau of WIPO—Geneva, Switzerland, Jul. 1, 2021. 13 pages.

International Search Report and Written Opinion—PCT/US2019/058460—ISA/EPO—Jun. 18, 2020. 21 pages.

Partial International Search Report—PCT/US2019/058460—ISA/EPO—Feb. 14, 2020. 17 pages.

* cited by examiner

MESSAGE BROADCASTING FOR VEHICLES

RELATED APPLICATIONS

This application is a continuation application of U.S. Non-Provisional application Ser. No. 16/439,956, entitled "Message Broadcasting for Vehicles" filed Jun. 13, 2019, which claims the benefit of priority to U.S. Provisional Application No. 62/782,573, entitled "Intention Broadcasting for Autonomous Driving" filed Dec. 20, 2018, the entire contents of both of which are hereby incorporated by reference for all purposes.

BACKGROUND

Automobiles and trucks are becoming more intelligent as the industry moves towards deploying autonomous and semi-autonomous vehicles. Autonomous and semi-autonomous vehicles can detect information about their location and surroundings (for example, using radar, lidar, GPS, file odometers, accelerometers, cameras, and other sensors), and include control systems that interpret sensory information to identify hazards and determine navigation paths to follow. Autonomous and semi-autonomous vehicles include control systems to operate with limited or no control from an occupant or other operator of the automobile.

SUMMARY

Various aspects include methods enabling a vehicle, such as an autonomous vehicle, a semi-autonomous vehicle, etc., to broadcast motion plans to surrounding vehicles, such as autonomous vehicles, semi-autonomous vehicles, and/or driver-operated vehicles. Various aspects include methods for using motion plans received from one or more surrounding vehicles. In various embodiments, motion plans may include a vehicle's trajectory and one or more descriptors associated with the vehicle and/or the vehicle owner and/or operator. In various embodiments, motion plans may be used at least in part to control a vehicle.

Various aspects include methods of controlling a vehicle that may include receiving an intention message including a motion plan for a vehicle transmitting the motion plan (the "transmitting vehicle"), wherein the motion plan comprises a trajectory of the transmitting vehicle and one or more vehicle descriptors associated with the transmitting vehicle, parsing the intention message to identify the motion plan for the transmitting vehicle, and controlling the vehicle based at least in part on the motion plan. In some aspects, the one or more vehicle descriptors may include a sensor perceptible attribute.

In some aspects, controlling the vehicle based at least in part on the motion plan may include determining an expected region of interest for the vehicle based at least in part on the motion plan, and applying a detection algorithm to received sensor data at the expected region of interest to detect the transmitting vehicle in the received sensor data based at least in part on the sensor perceptible attribute. In some aspects, the method may further include selecting the detection algorithm based at least in part on the received motion plan.

In some aspects, controlling the vehicle based at least in part on the motion plan may include correlating vehicle detection sensor data with the transmitting vehicle based at least in part on the sensor perceptible attribute.

In some aspects, the one or more vehicle descriptors may include a vehicle physical capability. In some aspects, controlling the vehicle based at least in part on the motion plan may include setting a behavior prediction for the transmitting vehicle based at least in part on the motion plan. Some aspects may further include determining whether a behavior of the transmitting vehicle conforms to the behavior prediction, and updating the behavior prediction based at least in part on the vehicle physical capability in response to determining that the behavior of the transmitting vehicle does not conform to the behavior prediction.

In some aspects, the one or more vehicle descriptors may include a vehicle location attribute. In some aspects, controlling the vehicle based at least in part on the motion plan may include determining a position of the transmitting vehicle based at least in part on the vehicle location attribute, determining whether a comparison between a position of the vehicle and the position of the transmitting vehicle indicate an error, and triggering a recalculation of the position of the vehicle in response to determining the comparison between the position of the vehicle and the position of the transmitting vehicle indicate an error.

In some aspects, controlling the vehicle based at least in part on the motion plan may include determining whether the motion plan is unsafe, and sending a safety warning to the transmitting vehicle in response to determining the motion plan is unsafe.

Various aspects for broadcasting a message from a vehicle may include determining a motion plan for the vehicle, wherein the motion plan comprises a trajectory of the vehicle and one or more vehicle descriptors of the vehicle, generating an intention message based at least in part on the determined motion plan, and broadcasting the intention message from the vehicle. In some aspects, the one or more vehicle descriptors may include a sensor perceptible attribute, a vehicle physical capability, or a vehicle location attribute.

Further aspects include a vehicle including a processor configured with processor-executable instructions to perform operations of any of the methods summarized above. Further aspects include a non-transitory processor-readable storage medium having stored thereon processor-executable software instructions configured to cause a processor to perform operations of any of the methods summarized above. Further aspects include a processing device for use in a vehicle and configured to perform operations of any of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1A:
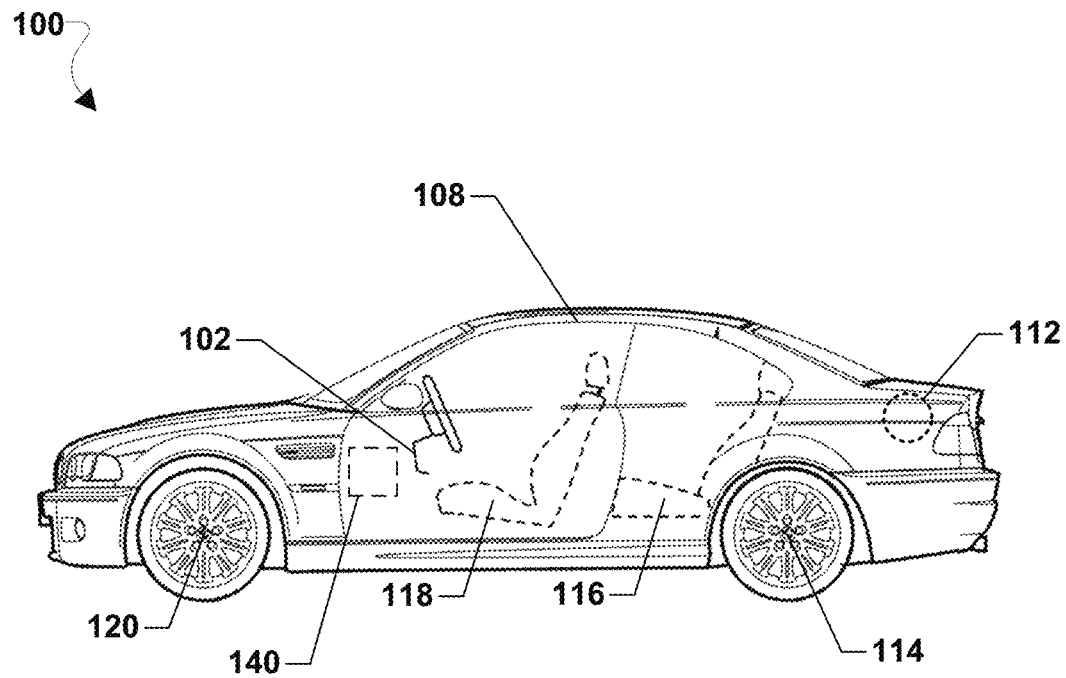
FIGS. 1A and 1B are component block diagrams illustrating a vehicle suitable for implementing various embodiments.

Various aspects will be described in detail with reference to the accompanying drawings. Wherever possible, the same reference numbers will be used throughout the drawings to refer to the same or like parts. References made to particular examples and embodiments are for illustrative purposes and are not intended to limit the scope of the various aspects or the claims.

The surface transportation industry has increasingly looked to leverage the growing capabilities of cellular and wireless communication technologies through the adoption of Intelligent Transportation Systems (ITS) technologies to increase intercommunication and safety for both driver-operated vehicles and autonomous vehicles. The cellular vehicle-to-everything (C-V2X) protocol defined by the $3^{rd}$ Generation Partnership Project (3GPP) supports ITS technologies and serves as the foundation for vehicles to communicate directly with the communication devices around them.

C-V2X defines two transmission modes that, together, provide a 360° non-line-of-sight awareness and a higher level of predictability for enhanced road safety and autonomous driving. A first transmission mode includes direct C-V2X, which includes vehicle-to-vehicle (V2V), vehicle-to-infrastructure (V2I), and vehicle-to-pedestrian (V2P), and that provides enhanced communication range and reliability in the dedicated ITS 5.9 gigahertz (GHz) spectrum that is independent of a cellular network. A second transmission mode includes vehicle-to-network communications (V2N) in mobile broadband systems and technologies, such as third generation wireless mobile communication technologies (3G) (e.g., global system for mobile communications (GSM®) evolution (EDGE) systems, code division multiple access (CDMA) 2000 (CDMA 2000 ®) systems, etc.), fourth generation wireless mobile communication technologies (4G) (e.g., long term evolution (LTE®) systems, LTE-Advanced systems, mobile Worldwide Interoperability for Microwave Access (mobile WiMAX®) systems, etc.), fifth generation wireless mobile communication technologies (5G) (e.g., 5G New Radio (5G NR) systems, etc.), etc.

The term "system-on-chip" (SOC) is used herein to refer to a set of interconnected electronic circuits typically, but not exclusively, including one or more processors, a memory, and a communication interface. The SOC may include a variety of different types of processors and processor cores, such as a general purpose processor, a central processing unit (CPU), a digital signal processor (DSP), a graphics processing unit (GPU), an accelerated processing unit (APU), a sub-system processor, an auxiliary processor, a single-core processor, and a multicore processor. The SOC may further embody other hardware and hardware combinations, such as a field programmable gate array (FPGA), a configuration and status register (CSR), an application-specific integrated circuit (ASIC), other programmable logic device, discrete gate logic, transistor logic, registers, performance monitoring hardware, watchdog hardware, counters, and time references. SOCs may be integrated circuits (ICs) configured such that the components of the ICs reside on the same substrate, such as a single piece of semiconductor material (e.g., silicon, etc.).

Various embodiments include methods, vehicles, vehicle management systems, and processing devices configured to implement the methods for broadcasting, receiving, and/or otherwise using intentions and/or motion plans during operation of vehicles, such as autonomous vehicles, semi-autonomous vehicles, driver-operated vehicles, etc.

Autonomous and semi-autonomous vehicles, such as cars and trucks, are becoming a reality on city streets. Autonomous and semi-autonomous vehicles typically include a plurality of sensors, including cameras, radar, and lidar, that collect information about the environment surrounding the vehicle. For example, such collected information may enable the vehicle to recognize the roadway, identify objects to avoid, and track the movement and future position of other vehicles to enable partial or fully autonomous navigation. Similarly, non-autonomous vehicles, such as vehicles that cannot operate in an autonomous driving or semi-autonomous driving mode, may also include a plurality of sensors, including cameras, radar, and lidar, that collect information about the environment surrounding the vehicle. For example, such collected information may enable the vehicle to recognize the roadway, identify objects to avoid, and track the movement and future position of other vehicles to provide warnings to a driver of the vehicle A problem in autonomous driving of selecting an optimal driving action in an uncertain environment with uncertain agents can be modeled as a partially-observable Markov decision process (POMDP). In general, solutions to POMDPs are computationally intractable, so much research is devoted to finding ways to sufficiently approximate the problem such that online and real-time solutions are possible. Autonomous vehicles can simulate possible actions in order to determine the range of expected outcomes based on each action. There may be some reward or risk or penalty for each action and testing each possible action that can be searched can allow the autonomous vehicle to select the action with the most reward and/or least likely penalty.

Autonomous driving stacks are predominantly designed as independent, standalone systems. In other words, an autonomous vehicle is tasked with inferring its own belief about the state of the world and its evolution without help from the other agents in the environment. Equipped only with its onboard sensors and computing power, the autonomous vehicle's belief of the world can be uncertain and there are infinitely many possibilities for how the world may evolve in time. Thus, the autonomous vehicle is required to search very large spaces of possibilities to decide what action to take next.

Incorporating C-V2X (connected vehicles sharing information) with autonomous driving stacks can significantly reduce the dimensionality of the POMDP by increasing the certainty of important pieces of information. Various embodiments provide for broadcasting an intention message from an autonomous (or semi-autonomous) vehicle comprising a motion plan for that vehicle. A motion plan may be an indication of that vehicle's current position and an indication of how that vehicle expects its position to change over time. For example, a motion plan may indicate a position of a vehicle and a trajectory the vehicle will follow for a period of time. In various embodiments, the indication of how that vehicle expects its position to change over time may be an affirmative indication of a decision already made by that vehicle. In that manner, motion plans indicate an expected course of action and may be distinguished from requests to take an action (or other type of confirmation requiring communications) that may be exchanged between vehicles. The sharing of a motion plan via broadcasting intentions of autonomous (or semi-autonomous) vehicles to surrounding vehicles may provide a much greater benefit within the POMDP and may reduce the POMDP to a Markov decision process (MDP) that may require far less computational resources to solve.

Various embodiments enable autonomous (or semi-autonomous) vehicles to broadcast their respective intentions and/or motion plans to surrounding vehicles, such as autonomous vehicles, semi-autonomous vehicles, non-autonomous vehicles, etc. There may be advantages to the communication of intentions and/or motion plan information throughout the entire autonomous vehicle software stack.

In various embodiments, a motion plan may be a trajectory. An autonomous (or semi-autonomous) vehicle may know its current position and the direction and/or next action the autonomous (or semi-autonomous) vehicle may take to arrive at a next position at a next time. For example, the autonomous vehicle may have a trajectory to get to a next point from a current point. In various embodiments, a motion plan may include a trajectory and one or more vehicle descriptors associated with the vehicle and/or the vehicle owner and/or operator. For example, vehicle descriptors may include sensor perceptible attributes of the vehicle, such as vehicle color, vehicle license plate number, vehicle size, etc. As a further example, vehicle descriptors may include vehicle physical capabilities, such as vehicle type, vehicle turning radius, vehicle top speed, vehicle maximum acceleration, etc. As a still further example, vehicle descriptors may include vehicle location attributes, such as the vehicle's latitude and longitude, the vehicle's distance from and/or orientation to a known landmark in a coordinate plane, etc. Sharing the motion plan with other vehicles, such as other autonomous vehicles, other semi-autonomous vehicles, other non-autonomous vehicles, etc., may provide benefits to the other vehicles receiving the motion plan and/or the vehicle transmitting the motion plan.

In various embodiments, a vehicle, such as an autonomous vehicle, a semi-autonomous vehicle, a non-autonomous vehicle, etc., may receive an intention message including at least a motion plan. In various embodiments, the motion plan may be shared among one or more (e.g., all) of the components throughout the autonomous vehicle stack and/or may be shared among one or more (e.g., all) other components of the vehicle. Sharing that motion plan may enable a transmitting vehicle to share its position and share how that position is expect to evolve over time for that sharing vehicle. Sharing a motion plan may enable an autonomous or semi-autonomous vehicle receiving the motion plan to determine how the motions of the vehicle transmitting the motion plan will affect the vehicle receiving the motion plan.

In various embodiments, an intention message may include an identifier of the vehicle broadcasting the intention message, the current position of the vehicle broadcasting the intention message, a motion plan of the vehicle broadcasting the intention message, and/or other data related to the vehicle broadcasting the intention message.

In various embodiments, a motion plan may include a vehicle's position and an indication of how the position over time to is expected to change. In some embodiments, a motion plan may include a vehicle's trajectory. In some embodiments, a motion plan may include a vehicle's trajectory and one or more vehicle descriptors associated with the vehicle and/or the vehicle owner and/or operator. In some embodiments, a motion plan may include an indication of an expected next position of the reporting vehicle at a certain time. In some embodiments, a motion plan may include a vehicle's motion vector. In some embodiments, a motion plan may include an indication of the coordinate plane used for determining the vehicle's indicated position. In various embodiments, the motion plan may describe features of the vehicle transmitting the motion plan, such as its size, orientation, color, vehicle type, etc. In various embodiments, the motion plan may indicate the speed of the vehicle transmitting the motion plan, orientation of the vehicle transmitting the motion plan, acceleration of the vehicle transmitting the motion plan, or any other state information of the vehicle transmitting the motion plan. In various embodiments, the motion plan may indicate future actions (or intentions) of the vehicle transmitting the motion plan, such as "turning on left blinker in five seconds", "turning right in two seconds", "braking in one hundred feet", or any other type actions or intentions relevant to driving.

In various embodiments, intention messages may be broadcast from an autonomous (or semi-autonomous) vehicle, such as by C-V2X transmission modes. In various embodiments, intention messages may be broadcast periodically, such as at a set time interval, in response to a change in intention of a broadcasting vehicle, etc.

In various embodiments, a vehicle, such as an autonomous vehicle, a semi-autonomous vehicle, a non-autonomous vehicle, etc., may receive a broadcast intention message and may parse the received intention message to determine the broadcasting vehicle's identifier, the current position of the intention message, and the motion plan, and/or any other information indicated within the intention message. In various embodiments, broadcast intention messages may be received and parsed regardless of the operating mode of the vehicle. For example, broadcast intention messages may be received by an autonomous or semi-autonomous vehicle being actively controlled by a driver at a given time. In various embodiments, the broadcasting vehicle's identifier, the current position of the intention message, and the motion plan, and/or any other information indicated within the intention message may be provided to various hardware and software components of the receiving vehicle. For example, the broadcasting vehicle's identifier, the current position of the intention message, and the motion plan, and/or any other information indicated within the intention message may be stored in one or more memory locations on the receiving vehicle, may be sent to one or more layers of an autonomous vehicle management system, may be sent to one or more layers of a vehicle management system, may be sent to a vehicle safety and crash avoidance system, etc. In various embodiments, motion plans may be used by one or more layers of the vehicle management system to augment various decision making and/or autonomous driving operations. As examples, a received motion plan may be used by the vehicle management system in: sensor fusion processing; behavior prediction; behavioral planning; motion planning; position localization; and/or sharing the burden of safety operations between vehicles.

In various embodiments, a received motion plan broadcast from another vehicle may be used in sensor perception operations of a vehicle, such as an autonomous vehicle, a semi-autonomous vehicle, a non-autonomous vehicle, etc. Sensor perception may include operations to control where a sensor looks to confirm a detection of an object, such as another vehicle. In various embodiments, a motion plan for another vehicle may enable a region of interest for perceiving that vehicle in sensor data for the receiving vehicle to be narrowed to the perceptual space defined by the motion plan broadcasted by the autonomous vehicle. Sensor perceptual data on where the system would expect that car to be may confirm or deny whether the vehicle receiving the motion plan (e.g., an autonomous vehicle, a semi-autonomous vehicle, a non-autonomous vehicle, etc.) is handling detection of other vehicles correctly. In perception systems, vehicles must be picked out of potentially terabytes of data coming into the vehicle from many different cameras, many different radars, and many other different sensors. The received data from these sensor needs to be processed by the perception layers in fractions of seconds to identify objects in the data and get that processed sensor data to other layers in the vehicle management system. Being able to focus on a specific region of interest in the data in the space around the vehicle because an object, such as the motion plan broadcasting vehicle, is expected in that region of interest may increase the speed of detection of that vehicle when compared with analyzing the data as a whole. Additionally, when a motion plan indicates vehicle descriptors that may be sensor perceptible attributes, being able to focus the sensor toward a specific sensor perceptible attribute, such as vehicle color, vehicle size, etc., may increase the speed of detection of that vehicle when compared with analyzing the data as a whole. In various embodiments, the motion plan may be used to determine the region of interest to apply to the raw sensor data to perceive a vehicle in that raw sensor data. In some embodiments, the motion plan may be used to select and/or modify the algorithm used to perceive vehicles in the raw sensor data. For example, a different algorithm may be used when the motion plan broadcasting vehicle is expected to be head-on to the receiving vehicle than when the motion plan broadcasting vehicle is expected to be perpendicular to the receiving vehicle. As a further example, a different detection threshold may be used depending on whether a motion plan indicates the broadcasting vehicle is expected to be in a given space. As a specific example, without a motion plan a receiving vehicle may only report detections that pass with a 90% confidence, while with a motion plan the receiving vehicle may report detections that pass a 50% confidence in a region of interest associated with the motion plan. In some embodiments, the motion plan may be used to confirm whether or not a specific vehicle is perceived in the raw sensor data. For example, the detection of a sensor perceptible attribute of a vehicle included in a motion plan as a vehicle descriptor (e.g., the vehicle's color, vehicle's license plate number, etc.) in the raw sensor data may confirm that the vehicle transmitting the motion plan was the actual vehicle perceived in a region of interest by another vehicle in the vicinity.

In various embodiments, a received motion plan broadcast from another vehicle may be used in sensor fusion operations of a vehicle, such as an autonomous vehicle, a semi-autonomous vehicle, a non-autonomous vehicle, etc. Sensor fusion operations may be operations to combine and associate sensor data and associate that sensor data with a tracked object. A motion plan may improve the performance of data association and tracking operations of a sensor fusion layer of a vehicle management system. The vehicle management system may use the motion plan to determine how to fuse all the raw detections of other vehicles in an environment together. For example, based on the motion plan broadcast for a vehicle, the receiving vehicle may be enabled to determine a radar detection, a LIDAR detection, and a camera detection are actually all the same vehicle because the detections all correlate to the received motion plan for that vehicle rather than initially treating the three detections as separate vehicles. As a specific example, different sensors of the receiving vehicle positively identifying one or more sensor perceptible attributes of a vehicle included in a motion plan may confirm that the sensors are detecting the same vehicle that sent the motion plan. Additionally, the motion plan may enable the receiving vehicle to determine that those vehicle detections will evolve together. The ability to compare vehicle detections to motion plans may enable outlier measurements to be discarded. For example, a tracked vehicle's motion plan indicating it intends to stay in a current lane may enable a detection not corresponding to that lane to be associated with a new object rather than the previously tracked vehicle. The presence of a motion plan may reduce uncertainty in the sensor fusion operations. The noisy detections from the perception layer may be compared with the underlying trajectories and/or vehicle descriptors in a motion plan to give an improved certainty to sensor fusion operations.

In various embodiments, a received motion plan broadcast from another vehicle may be used in behavior prediction, behavioral planning, and/or motion planning operations of a vehicle, such as an autonomous vehicle, a semi-autonomous vehicle, a non-autonomous vehicle, etc. The broadcast of a motion plan by a reporting vehicle may enable a vehicle receiving that motion plan to predict the behavior of that vehicle with a definable certainty. The benefit of a motion plan and a position may be that the motion plan may be treated as the predicted behavior of that vehicle. This certainty in behavior prediction may reduce the dimensionality of the POMDP by knowing the behavioral/trajectory prediction exactly for surrounding cars that broadcast their respective motion plans. Sharing the motion plan may result in behavioral predictions with small or no uncertainty. Additionally, knowing the intended motion of a vehicle may eliminate the need to estimate that vehicle's motion, thereby reducing the computational resources associated with behavior prediction.

In various embodiments, receiving a motion plan broadcast by a vehicle reduces the behavioral planning searches over a smaller space of possibilities. Given the perfect (or near perfect) knowledge of the state and actions of other vehicles provided by those vehicles' broadcast motion plans, finding optimal actions for the receiving vehicle collapses from a POMDP to an MDP analysis in which there are a host of solutions suitable for online and real-time operations. As the uncertain number of infinite actions of the broadcasting vehicle are reduced to a finite number of intended actions by receiving the motion plan for that broadcasting vehicle, the behavioral planning layer of the vehicle stack may develop high level driving goals for the receiving vehicle. Additionally, a motion plan including vehicle descriptors that reflect vehicle physical capabilities of the vehicle transmitting the motion plan may reduce the space of possibilities for behavioral planning searches performed by a vehicle management system of a receiving vehicle by limiting the possible behaviors of the transmitting vehicle to be assessed by a vehicle behavior model to those within the transmitting vehicle's capabilities. For example, a type of vehicle indicated in a motion plan may be used by a receiving vehicle management system to constrain a maximum speed or acceleration of the vehicle in a vehicle behavior model based on the maximum speed or acceleration associated with that vehicle type. As another example, a turning radius of the vehicle indicated in a motion plan may be used by a receiving vehicle management system to constrain the potential turning paths modeled for the vehicle transmitting the motion plan to within the indicated turning radius.

In various embodiments, a vehicle management system receiving a motion plan broadcast by a vehicle including vehicle descriptors that reflect vehicle physical capabilities of the transmitting vehicle may use that information to reduce the space of possibilities for behavioral planning searches within a vehicle behavior model, such as after observing the vehicle deviating from a behavior prediction. In response to determining that a vehicle's observed behavior does not conform to a behavior prediction made by the vehicle management system, the behavior prediction for that vehicle may be updated based at least in part on vehicle capabilities determined from the received motion plan. For example, the vehicle management system may use the other vehicle's physical capabilities to collapse the possible future behaviors of the other vehicle determined by a vehicle behavior model from a POMDP to an MDP analysis in which there are a host of solutions suitable for online and real-time operations. For example, a type of vehicle indicated in a received motion plan may be used by the receiving vehicle management system to constrain a maximum speed or acceleration of the other vehicle used in updating the behavior prediction made by the vehicle behavior model based on the maximum speed or acceleration associated with that the type of the other vehicle. As another example, a turning radius of the other vehicle indicated in a motion plan may be used by the receiving vehicle management system to constrain the vehicle behavior model for potential turning paths of the vehicle transmitting the motion plan to within the indicated turning radius and use the vehicle behavior model updated in this manner to generate an updated other vehicle behavior prediction.

In various embodiments, a behavioral planning layer may provide a high-level driving goal to a motion planning layer. The motion planning layer may be responsible for actually planning the trajectory to execute that high-level maneuver and the motion planning layer may be responsible for ensuring the safety of executing that trajectory. Receiving a motion plan broadcast by another vehicle in the environment may enable the motion planning layer to perform fewer collision checks as a result of a prediction of the motion of that broadcasting vehicle being known with certainty. Collision checking is often a bottleneck of fast motion planning, so fewer checks may greatly speed up the overall autonomous driving algorithm. In various embodiments, a behavioral planning layer may provide high level driving goals and/or behavior models for other vehicles to a vehicle safety and crash avoidance system. The vehicle safety and crash avoidance system may use the high level driving goals and/or behavior models for other vehicles to perform safety checks, such as collision checks, etc., while the vehicle is driving to avoid crashes.

In various embodiments, a received motion plan broadcast from another vehicle may be used in position localization operations of a vehicle, such as an autonomous vehicle, semi-autonomous vehicle, non-autonomous vehicle, etc. In various embodiments, a localization layer of a vehicle management system may leverage the observations of the broadcasting vehicle to improve the position estimate of the receiving vehicle. In some embodiments, the localization layer (or positioning layer) may utilize the sensor fusion output describing the state of other vehicles and compare it to where these other vehicles are expected to be based on their broadcasted intentions in their respective motion plans. This may be similar to how map fusion is often done to augment positioning by comparing observation of lanes and landmarks to their expected positions based on an a priori known map. In this manner, the own vehicle localization process may leverage the observations of other vehicles using their respective motion plans. Thus, the receiving vehicle may better localize itself based on the broadcast motion plans of surrounding autonomous vehicles.

In various embodiments, localization may leverage a high-quality map in a global and/or local coordinate plan including known positions of landmarks in that map, such as lane markers, road signs, etc. In various embodiments, intention messages and/or motion plans broadcast by vehicles may indicate those vehicles distance from, and/or orientation to, a known landmark in a coordinate plane, such as a local and/or global coordinate plane. For example, a motion plan may indicate the transmitting vehicle's distance from, and/or orientation to, a known landmark in a coordinate plane, such as a local and/or global coordinate plane, such as in a vehicle location attribute type vehicle descriptor. A vehicle, such as an autonomous vehicle, semi-autonomous vehicle, non-autonomous vehicle, etc., receiving the indications from the broadcasting vehicles may compare its observations of those broadcasting vehicles and their position relative to the known landmark to the distance from the known landmark in the intention message and/or motion plan to assist in localization process performed on the receiving vehicle. For example, the receiving vehicle may compare its own observations to those in the received motion plans to determine whether there is an error or offset between its observations and those in the motion plans. An error or offset between its observations and those in the received motion plans may indicate to the receiving vehicle that it has localized its respective current position incorrectly. In response, the receiving vehicle may trigger a recalculation of its position. In various embodiments, the receiving vehicle may convert the observations in an intention message and/or motion plan from one coordinate plane to another coordinate plane. For example, the vehicle may convert the observations of a broadcasting vehicle from a global coordinate plane (e.g., latitude & longitude) to a local (e.g., street map-centric) coordinate plane. As a specific example, two different autonomous vehicles may both broadcast their respective motion plans and those motion plans may be received by the receiving vehicle. Observations of a landmark in those two motion plans may match, but may be different from the observation of the receiving vehicle of that same landmark. The agreement of two observations in the different motion plans and their difference from the receiving vehicle's observations may indicate the receiving vehicle localized its position wrong. In response, the receiving vehicle may recalculate its position.

In various embodiments, a received motion plan broadcast from another vehicle may be used to share the burden of safety operations between vehicles, such as autonomous vehicles, semi-autonomous vehicles, etc. In various embodiments, broadcasting motion plans also allows for extensions like sharing the burden of safety between the equipped vehicles. A vehicle can verify that received motion plans are safe within its own belief of the environment, and issue warnings back to the broadcasting vehicle if safety appears compromised by the received motion plan. For example, the receiving vehicle may detect an object that will cause a motion plan of a broadcasting vehicle to be unsafe even though the broadcasting vehicle did not yet sense or otherwise observe that object. The receiving vehicle may determine the motion plan is unsafe and may indicate a warning to the broadcasting vehicle. The warning may include the observation of the object causing the motion plan to be unsafe.

Another advantage of broadcasting intentions is that nothing is impacted in the vehicle management system if no other vehicles in the vicinity broadcast intention messages. If no intention messages are received, the vehicle management system may revert to making the vehicle responsible for the full inference of the state of the world.

Figure 1B:
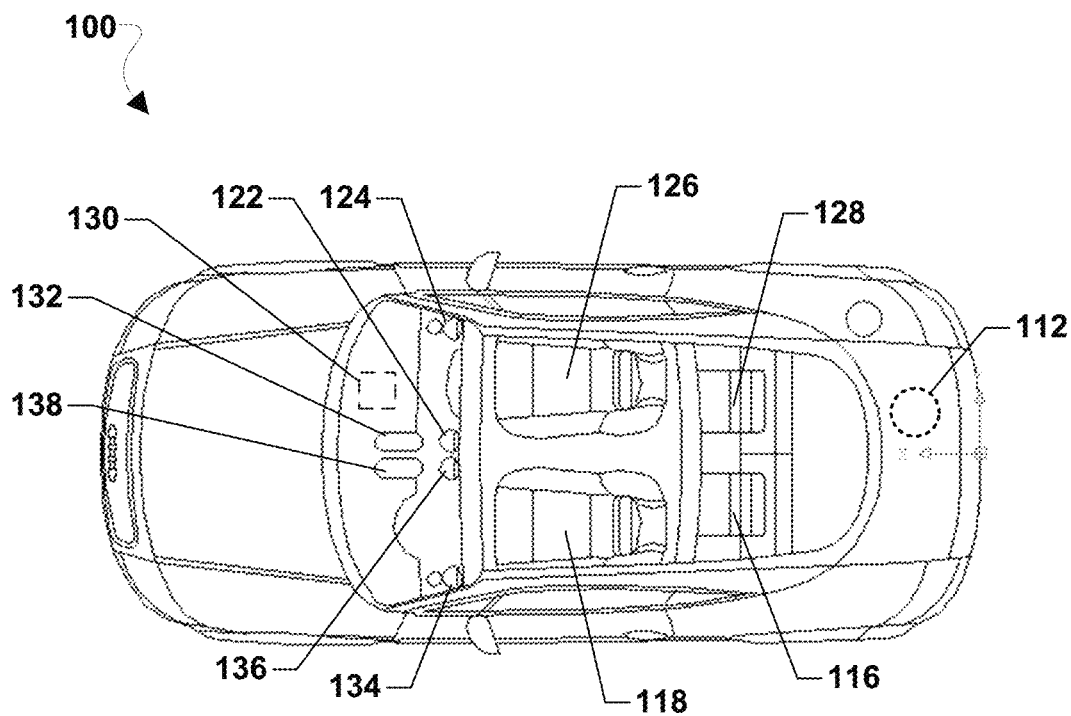

Various embodiments may be implemented within a variety of vehicles, an example vehicle 100 of which is illustrated in FIGS. 1A and 1B. With reference to FIGS. 1A and 1B, a vehicle 100 may include a control unit 140 and a plurality of sensors 102-138, including satellite geopositioning system receivers 108, occupancy sensors 112, 116, 118, 126, 128, tire pressure sensors 114, 120, cameras 122, 136, microphones 124, 134, impact sensors 130, radar 132, and lidar 138. The plurality of sensors 102-138, disposed in or on the vehicle, may be used for various purposes, such as autonomous and semi-autonomous navigation and control, crash avoidance, position determination, etc., as well as to provide sensor data regarding objects and people in or on the vehicle 100. The sensors 102-138 may include one or more of a wide variety of sensors capable of detecting a variety of information useful for navigation and collision avoidance. Each of the sensors 102-138 may be in wired or wireless communication with a control unit 140, as well as with each other. In particular, the sensors may include one or more cameras 122, 136 or other optical sensors or photo optic sensors. The sensors may further include other types of object detection and ranging sensors, such as radar 132, lidar 138, IR sensors, and ultrasonic sensors. The sensors may further include tire pressure sensors 114, 120, humidity sensors, temperature sensors, satellite geopositioning sensors 108, accelerometers, vibration sensors, gyroscopes, gravimeters, impact sensors 130, force meters, stress meters, strain sensors, fluid sensors, chemical sensors, gas content analyzers, pH sensors, radiation sensors, Geiger counters, neutron detectors, biological material sensors, microphones 124, 134, occupancy sensors 112, 116, 118, 126, 128, proximity sensors, and other sensors.

The vehicle control unit 140 may be configured with processor-executable instructions to perform various embodiments using information received from various sensors, particularly the cameras 122, 136. In some embodiments, the control unit 140 may supplement the processing of camera images using distance and relative position (e.g., relative bearing angle) that may be obtained from radar 132 and/or lidar 138 sensors. The control unit 140 may further be configured to control steering, breaking and speed of the vehicle 100 when operating in an autonomous or semi-autonomous mode using information regarding other vehicles determined using various embodiments.

Figure 1C:
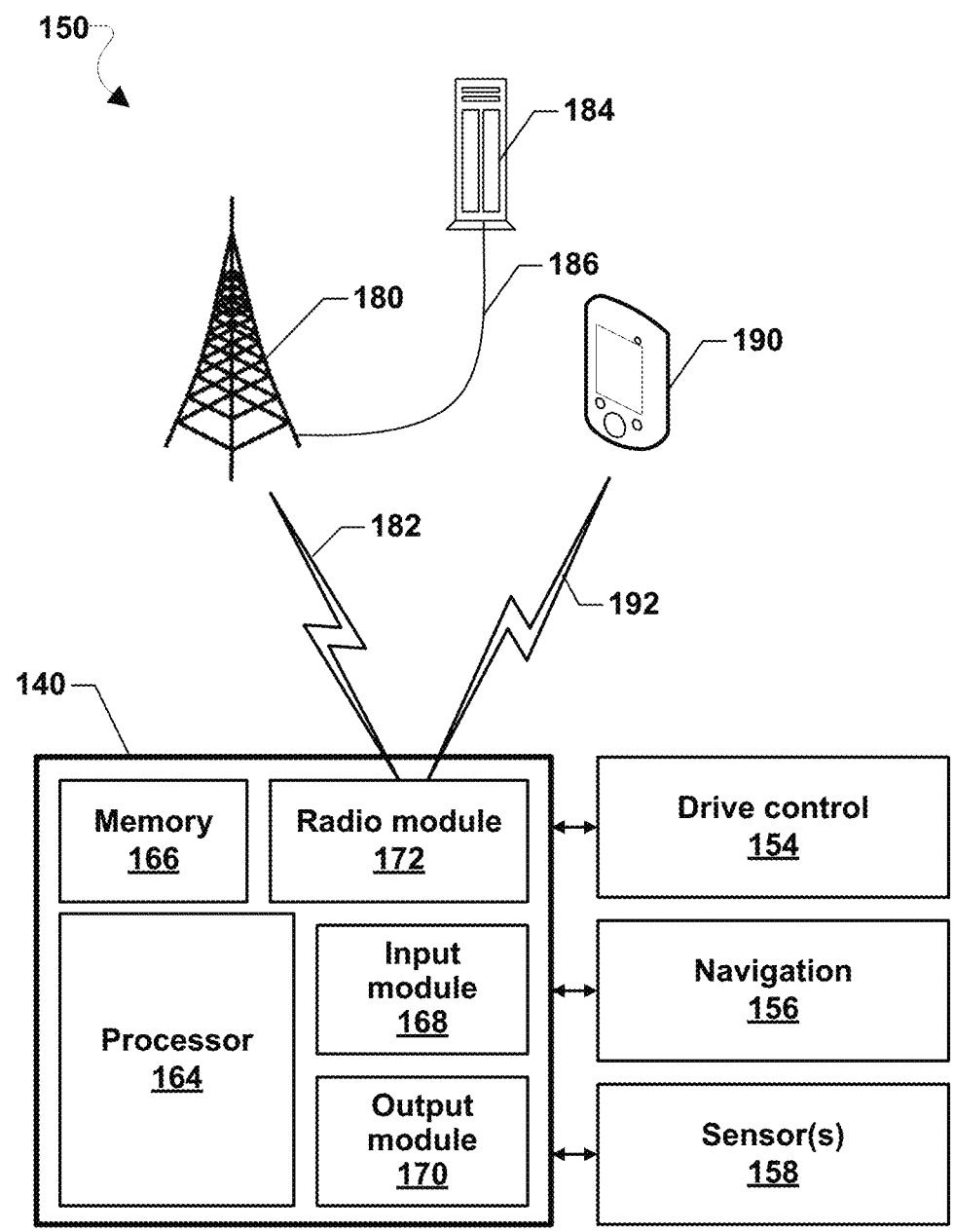
FIG. 1C is a component block diagram illustrating components of a vehicle suitable for implementing various embodiments.

FIG. 1C is a component block diagram illustrating a system 150 of components and support systems suitable for implementing various embodiments. With reference to FIGS. 1A, 1B, and 1C, a vehicle 100 may include a control unit 140, which may include various circuits and devices used to control the operation of the vehicle 100. In the example illustrated in FIG. 1C, the control unit 140 includes a processor 164, memory 166, an input module 168, an output module 170 and a radio module 172. The control unit 140 may be coupled to and configured to control drive control components 154, navigation components 156, and one or more sensors 158 of the vehicle 100.

As used herein, the terms "component," "system," "unit," "module," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The control unit 140 may include a processor 164 that may be configured with processor-executable instructions to control maneuvering, navigation, and/or other operations of the vehicle 100, including operations of various embodiments. The processor 164 may be coupled to the memory 166. The control unit 162 may include the input module 168, the output module 170, and the radio module 172.

The radio module 172 may be configured for wireless communication. The radio module 172 may exchange signals 182 (e.g., command signals for controlling maneuvering, signals from navigation facilities, etc.) with a network transceiver 180, and may provide the signals 182 to the processor 164 and/or the navigation unit 156. In some embodiments, the radio module 172 may enable the vehicle 100 to communicate with a wireless communication device 190 through a wireless communication link 192. The wireless communication link 192 may be a bidirectional or unidirectional communication link, and may use one or more communication protocols.

The input module 168 may receive sensor data from one or more vehicle sensors 158 as well as electronic signals from other components, including the drive control components 154 and the navigation components 156. The output module 170 may be used to communicate with or activate various components of the vehicle 100, including the drive control components 154, the navigation components 156, and the sensor(s) 158.

The control unit 140 may be coupled to the drive control components 154 to control physical elements of the vehicle 100 related to maneuvering and navigation of the vehicle, such as the engine, motors, throttles, steering elements, flight control elements, braking or deceleration elements, and the like. The drive control components 154 may also include components that control other devices of the vehicle, including environmental controls (e.g., air conditioning and heating), external and/or interior lighting, interior and/or exterior informational displays (which may include a display screen or other devices to display information), safety devices (e.g., haptic devices, audible alarms, etc.), and other similar devices.

The control unit 140 may be coupled to the navigation components 156, and may receive data from the navigation components 156 and be configured to use such data to determine the present position and orientation of the vehicle 100, as well as an appropriate course toward a destination. In various embodiments, the navigation components 156 may include or be coupled to a global navigation satellite system (GNSS) receiver system (e.g., one or more Global Positioning System (GPS) receivers) enabling the vehicle 100 to determine its current position using GNSS signals. Alternatively, or in addition, the navigation components 156 may include radio navigation receivers for receiving navigation beacons or other signals from radio nodes, such as Wi-Fi access points, cellular network sites, radio station, remote computing devices, other vehicles, etc. Through control of the drive control elements 154, the processor 164 may control the vehicle 100 to navigate and maneuver. The processor 164 and/or the navigation components 156 may be configured to communicate with a server 184 on a network 186 (e.g., the Internet) using a wireless connection 182 with a cellular data network 180 to receive commands to control maneuvering, receive data useful in navigation, provide real-time position reports, and assess other data.

The control unit 162 may be coupled to one or more sensors 158. The sensor(s) 158 may include the sensors 102-138 as described, and may the configured to provide a variety of data to the processor 164.

While the control unit 140 is described as including separate components, in some embodiments some or all of the components (e.g., the processor 164, the memory 166, the input module 168, the output module 170, and the radio module 172) may be integrated in a single device or module, such as a system-on-chip (SOC) processing device. Such an SOC processing device may be configured for use in vehicles and be configured, such as with processor-executable instructions executing in the processor 164, to perform operations of various embodiments when installed into a vehicle.

Figure 2A:
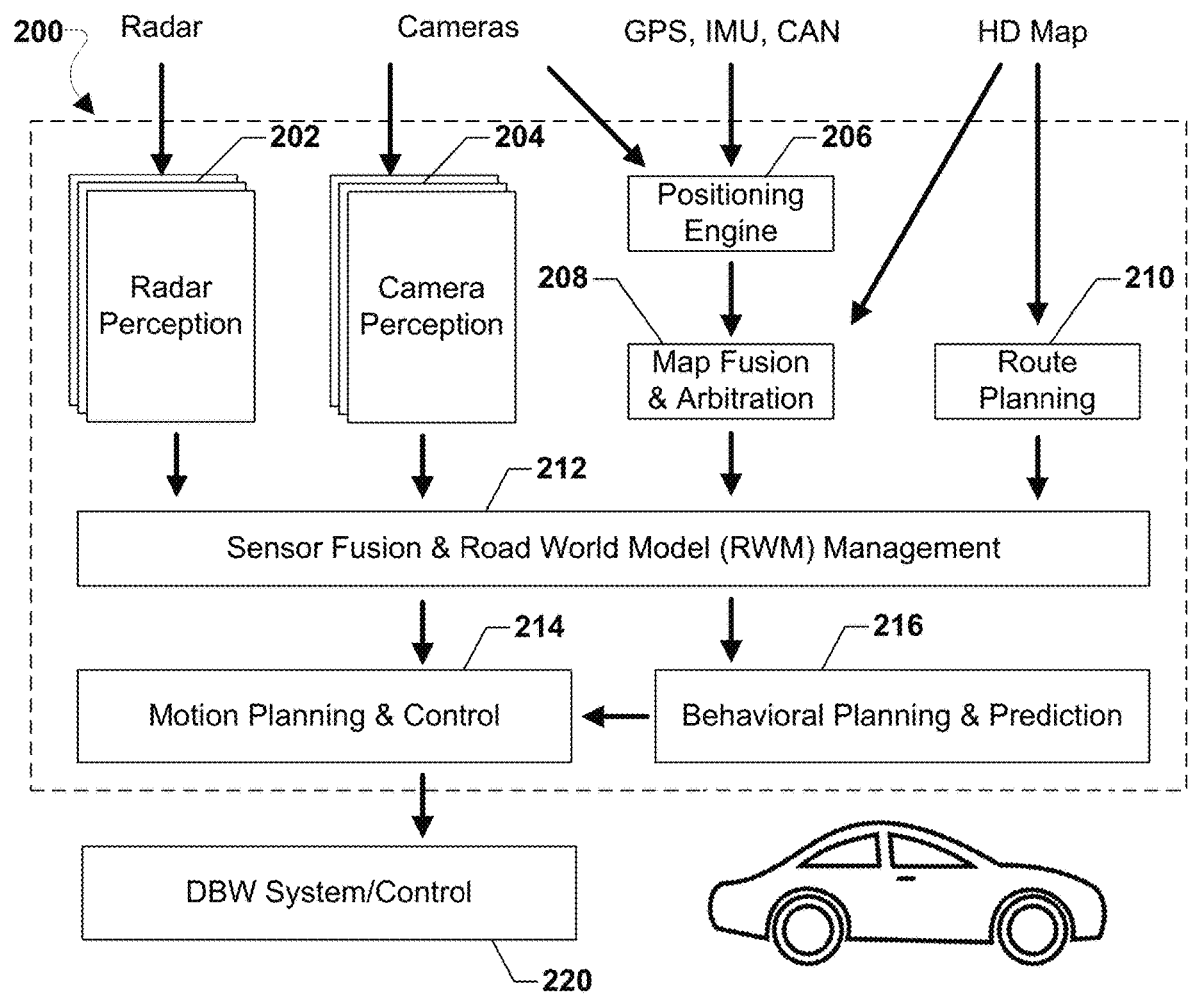
FIG. 2A is a component block diagram illustrating components of an example vehicle management system according to various embodiments.

FIG. 2A illustrates an example of subsystems, computational elements, computing devices or units within a vehicle management system 200, which may be utilized within a vehicle 100. With reference to FIGS. 1A-2A, in some embodiments, the various computational elements, computing devices or units within vehicle management system 200 may be implemented within a system of interconnected computing devices (i.e., subsystems), that communicate data and commands to each other (e.g., indicated by the arrows in FIG. 2A). In other embodiments, the various computational elements, computing devices or units within vehicle management system 200 may be implemented within a single computing device, such as separate threads, processes, algorithms or computational elements. Therefore, each subsystem/computational element illustrated in FIG. 2A is also generally referred to herein as "layer" within a computational "stack" that constitutes the vehicle management system 200. However, the use of the terms layer and stack in describing various embodiments are not intended to imply or require that the corresponding functionality is implemented within a single autonomous (or semi-autonomous) vehicle management system computing device, although that is a potential implementation embodiment. Rather the use of the term "layer" is intended to encompass subsystems with independent processors, computational elements (e.g., threads, algorithms, subroutines, etc.) running in one or more computing devices, and combinations of subsystems and computational elements.

In various embodiments, the vehicle management system stack 200 may include a radar perception layer 202, a camera perception layer 204, a positioning engine layer 206, a map fusion and arbitration layer 208, a route planning layer 210, sensor fusion and road world model (RWM) management layer 212, motion planning and control layer 214, and behavioral planning and prediction layer 216. The layers 202-216 are merely examples of some layers in one example configuration of the vehicle management system stack 200. In other configurations consistent with various embodiments, other layers may be included, such as additional layers for other perception sensors (e.g., LIDAR perception layer, etc.), additional layers for planning and/or control, additional layers for modeling, etc., and/or certain of the layers 202-216 may be excluded from the vehicle management system stack 200. Each of the layers 202-216 may exchange data, computational results and commands as illustrated by the arrows in FIG. 2A. Further, the vehicle management system stack 200 may receive and process data from sensors (e.g., radar, lidar, cameras, inertial measurement units (IMU) etc.), navigation systems (e.g., GPS receivers, IMUs, etc.), vehicle networks (e.g., Controller Area Network (CAN) bus), and databases in memory (e.g., digital map data). The vehicle management system stack 200 may output vehicle control commands or signals to the drive by wire (DBW) system/control unit 220, which is a system, subsystem or computing device that interfaces directly with vehicle steering, throttle and brake controls. The configuration of the vehicle management system stack 200 and DBW system/control unit 220 illustrated in FIG. 2A is merely an example configuration and other configurations of a vehicle management system and other vehicle components may be used in the various embodiments. As an example, the configuration of the vehicle management system stack 200 and DBW system/control unit 220 illustrated in FIG. 2A may be used in a vehicle configured for autonomous or semi-autonomous operation while a different configuration may be used in a non-autonomous vehicle.

The radar perception layer 202 may receive data from one or more detection and ranging sensors, such as radar (e.g., 132) and/or lidar (e.g., 138), and process the data to recognize and determine locations of other vehicles and objects within a vicinity of the vehicle 100. The radar perception layer 202 may include use of neural network processing and artificial intelligence methods to recognize objects and vehicles, and pass such information on to the sensor fusion and RWM management layer 212.

The camera perception layer 204 may receive data from one or more cameras, such as cameras (e.g., 122, 136), and process the data to recognize and determine locations of other vehicles and objects within a vicinity of the vehicle 100. The camera perception layer 204 may include use of neural network processing and artificial intelligence methods to recognize objects and vehicles, and pass such information on to the sensor fusion and RWM management layer 212.

The positioning engine layer 206 may receive data from various sensors and process the data to determine a position of the vehicle 100. The various sensors may include, but is not limited to, GPS sensor, an IMU, and/or other sensors connected via a CAN bus. The positioning engine layer 206 may also utilize inputs from one or more cameras, such as cameras (e.g., 122, 136) and/or any other available sensor, such as radars, LIDARs, etc.

The map fusion and arbitration layer 208 may access data within a high definition (HD) map database and receive output received from the positioning engine layer 206 and process the data to further determine the position of the vehicle 100 within the map, such as location within a lane of traffic, position within a street map, etc. The HD map database may be stored in a memory (e.g., memory 166). For example, the map fusion and arbitration layer 208 may convert latitude and longitude information from GPS into locations within a surface map of roads contained in the HD map database. GPS position fixes include errors, so the map fusion and arbitration layer 208 may function to determine a best guess location of the vehicle within a roadway based upon an arbitration between the GPS coordinates and the HD map data. For example, while GPS coordinates may place the vehicle near the middle of a two-lane road in the HD map, the map fusion and arbitration layer 208 may determine from the direction of travel that the vehicle is most likely aligned with the travel lane consistent with the direction of travel. The map fusion and arbitration layer 208 may pass map-based location information to the sensor fusion and RWM management layer 212.

The route planning layer 210 may utilize the HD map, as well as inputs from an operator or dispatcher to plan a route to be followed by the vehicle 100 to a particular destination. The route planning layer 210 may pass map-based location information to the sensor fusion and RWM management layer 212. However, the use of a prior map by other layers, such as the sensor fusion and RWM management layer 212, etc., is not required. For example, other stacks may operate and/or control the vehicle based on perceptual data alone without a provided map, constructing lanes, boundaries, and the notion of a local map as perceptual data is received.

The sensor fusion and RWM management layer 212 may receive data and outputs produced by the radar perception layer 202, camera perception layer 204, map fusion and arbitration layer 208, and route planning layer 210, and use some or all of such inputs to estimate or refine the location and state of the vehicle 100 in relation to the road, other vehicles on the road, and other objects within a vicinity of the vehicle 100. For example, the sensor fusion and RWM management layer 212 may combine imagery data from the camera perception layer 204 with arbitrated map location information from the map fusion and arbitration layer 208 to refine the determined position of the vehicle within a lane of traffic. As another example, the sensor fusion and RWM management layer 212 may combine object recognition and imagery data from the camera perception layer 204 with object detection and ranging data from the radar perception layer 202 to determine and refine the relative position of other vehicles and objects in the vicinity of the vehicle. As another example, the sensor fusion and RWM management layer 212 may receive information from vehicle-to-vehicle (V2V) communications (such as via the CAN bus) regarding other vehicle positions and directions of travel, and combine that information with information from the radar perception layer 202 and the camera perception layer 204 to refine the locations and motions of other vehicles. The sensor fusion and RWM management layer 212 may output refined location and state information of the vehicle 100, as well as refined location and state information of other vehicles and objects in the vicinity of the vehicle, to the motion planning and control layer 214 and/or the behavior planning and prediction layer 216.

As a further example, the sensor fusion and RWM management layer 212 may use dynamic traffic control instructions directing the vehicle 100 to change speed, lane, direction of travel, or other navigational element(s), and combine that information with other received information to determine refined location and state information. The sensor fusion and RWM management layer 212 may output the refined location and state information of the vehicle 100, as well as refined location and state information of other vehicles and objects in the vicinity of the vehicle 100, to the motion planning and control layer 214, the behavior planning and prediction layer 216 and/or devices remote from the vehicle 100, such as a data server, other vehicles, etc., via wireless communications, such as through C-V2X connections, other wireless connections, etc.

As a still further example, the sensor fusion and RWM management layer 212 may monitor perception data from various sensors, such as perception data from a radar perception layer 202, camera perception layer 204, other perception layer, etc., and/or data from one or more sensors themselves to analyze conditions in the vehicle sensor data. The sensor fusion and RWM management layer 212 may be configured to detect conditions in the sensor data, such as sensor measurements being at, above, or below a threshold, certain types of sensor measurements occurring, etc., and may output the sensor data as part of the refined location and state information of the vehicle 100 provided to the behavior planning and prediction layer 216 and/or devices remote from the vehicle 100, such as a data server, other vehicles, etc., via wireless communications, such as through C-V2X connections, other wireless connections, etc.

The refined location and state information may include vehicle descriptors associated with the vehicle and the vehicle owner and/or operator, such as: vehicle specifications (e.g., size, weight, color, on board sensor types, etc.); vehicle position, speed, acceleration, direction of travel, attitude, orientation, destination, fuel/power level(s), and other state information; vehicle emergency status (e.g., is the vehicle an emergency vehicle or private individual in an emergency); vehicle restrictions (e.g., heavy/wide load, turning restrictions, high occupancy vehicle (HOV) authorization, etc.); capabilities (e.g., all-wheel drive, four-wheel drive, snow tires, chains, connection types supported, on board sensor operating statuses, on board sensor resolution levels, etc.) of the vehicle; equipment problems (e.g., low tire pressure, weak breaks, sensor outages, etc.); owner/operator travel preferences (e.g., preferred lane, roads, routes, and/or destinations, preference to avoid tolls or highways, preference for the fastest route, etc.); permissions to provide sensor data to a data agency server (e.g., 184); and/or owner/operator identification information.

The behavioral planning and prediction layer 216 of the autonomous vehicle system stack 200 may use the refined location and state information of the vehicle 100 and location and state information of other vehicles and objects output from the sensor fusion and RWM management layer 212 to predict future behaviors of other vehicles and/or objects. For example, the behavioral planning and prediction layer 216 may use such information to predict future relative positions of other vehicles in the vicinity of the vehicle based on own vehicle position and velocity and other vehicle positions and velocity. Such predictions may take into account information from the HD map and route planning to anticipate changes in relative vehicle positions as host and other vehicles follow the roadway. The behavioral planning and prediction layer 216 may output other vehicle and object behavior and location predictions to the motion planning and control layer 214. Additionally, the behavior planning and prediction layer 216 may use object behavior in combination with location predictions to plan and generate control signals for controlling the motion of the vehicle 100. For example, based on route planning information, refined location in the roadway information, and relative locations and motions of other vehicles, the behavior planning and prediction layer 216 may determine that the vehicle 100 needs to change lanes and accelerate, such as to maintain or achieve minimum spacing from other vehicles, and/or prepare for a turn or exit. As a result, the behavior planning and prediction layer 216 may calculate or otherwise determine a steering angle for the wheels and a change to the throttle setting to be commanded to the motion planning and control layer 214 and DBW system/control unit 220 along with such various parameters necessary to effectuate such a lane change and acceleration. One such parameter may be a computed steering wheel command angle.

The motion planning and control layer 214 may receive data and information outputs from the sensor fusion and RWM management layer 212 and other vehicle and object behavior as well as location predictions from the behavior planning and prediction layer 216, and use this information to plan and generate control signals for controlling the motion of the vehicle 100 and to verify that such control signals meet safety requirements for the vehicle 100. For example, based on route planning information, refined location in the roadway information, and relative locations and motions of other vehicles, the motion planning and control layer 214 may verify and pass various control commands or instructions to the DBW system/control unit 220.

The DBW system/control unit 220 may receive the commands or instructions from the motion planning and control layer 214 and translate such information into mechanical control signals for controlling wheel angle, brake and throttle of the vehicle 100. For example, DBW system/control unit 220 may respond to the computed steering wheel command angle by sending corresponding control signals to the steering wheel controller.

In various embodiments, the vehicle management system stack 200 may include functionality that performs safety checks or oversight of various commands, planning or other decisions of various layers that could impact vehicle and occupant safety. Such safety check or oversight functionality may be implemented within a dedicated layer or distributed among various layers and included as part of the functionality. In some embodiments, a variety of safety parameters may be stored in memory and the safety checks or oversight functionality may compare a determined value (e.g., relative spacing to a nearby vehicle, distance from the roadway centerline, etc.) to corresponding safety parameter(s), and issue a warning or command if the safety parameter is or will be violated. For example, a safety or oversight function in the behavior planning and prediction layer 216 (or in a separate layer) may determine the current or future separate distance between another vehicle (as refined by the sensor fusion and RWM management layer 212) and the vehicle (e.g., based on the world model refined by the sensor fusion and RWM management layer 212), compare that separation distance to a safe separation distance parameter stored in memory, and issue instructions to the motion planning and control layer 214 to speed up, slow down or turn if the current or predicted separation distance violates the safe separation distance parameter. As another example, safety or oversight functionality in the motion planning and control layer 214 (or a separate layer) may compare a determined or commanded steering wheel command angle to a safe wheel angle limit or parameter, and issue an override command and/or alarm in response to the commanded angle exceeding the safe wheel angle limit.

Some safety parameters stored in memory may be static (i.e., unchanging over time), such as maximum vehicle speed. Other safety parameters stored in memory may be dynamic in that the parameters are determined or updated continuously or periodically based on vehicle state information and/or environmental conditions. Non-limiting examples of safety parameters include maximum safe speed, maximum brake pressure, maximum acceleration, and the safe wheel angle limit, all of which may be a function of roadway and weather conditions.

Figure 2B:
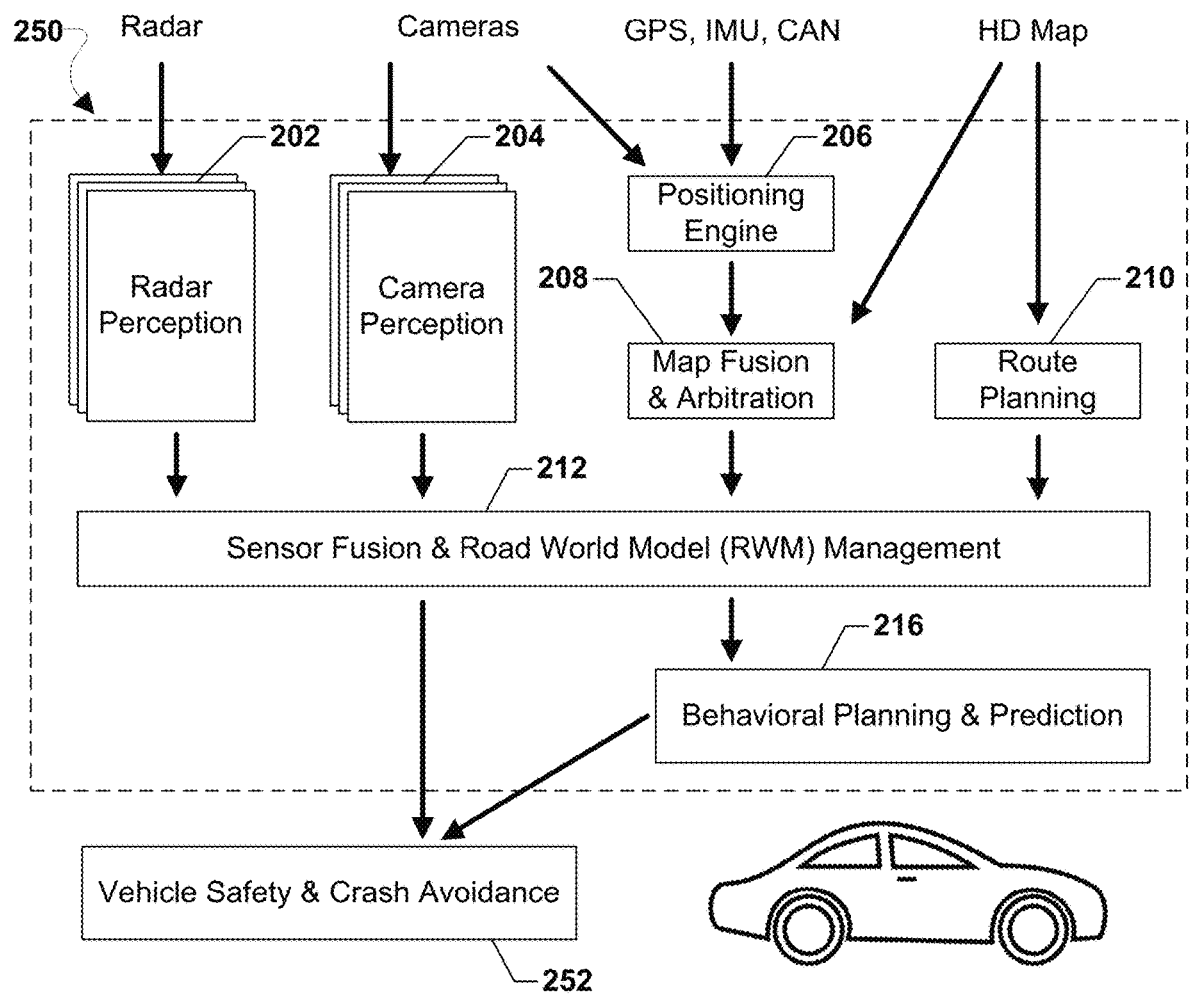
FIG. 2B is a component block diagram illustrating components of another example vehicle management system according to various embodiments.

FIG. 2B illustrates an example of subsystems, computational elements, computing devices or units within a vehicle management system 250, which may be utilized within a vehicle 100. With reference to FIGS. 1A-2B, in some embodiments, the layers 202, 204, 206, 208, 210, 212, and 216 of the vehicle management system stack 200 may be similar to those described with reference to FIG. 2A and the vehicle management system stack 250 may operate similar to the vehicle management system stack 200, except that the vehicle management system stack 250 may pass various data or instructions to a vehicle safety and crash avoidance system 252 rather than the DBW system/control unit 220. For example, the configuration of the vehicle management system stack 250 and the vehicle safety and crash avoidance system 252 illustrated in FIG. 2B may be used in a non-autonomous vehicle.

In various embodiments, the behavioral planning and prediction layer 216 and/or sensor fusion and RWM management layer 212 may output data to the vehicle safety and crash avoidance system 252. For example, the sensor fusion and RWM management layer 212 may output sensor data as part of refined location and state information of the vehicle 100 provided to the vehicle safety and crash avoidance system 252. The vehicle safety and crash avoidance system 252 may use the refined location and state information of the vehicle 100 to make safety determinations relative to the vehicle 100 and/or occupants of the vehicle 100. As another example, the behavioral planning and prediction layer 216 may output behavior models and/or predictions related to the motion of other vehicles to the vehicle safety and crash avoidance system 252. The vehicle safety and crash avoidance system 252 may use the behavior models and/or predictions related to the motion of other vehicles to make safety determinations relative to the vehicle 100 and/or occupants of the vehicle 100.

In various embodiments, the vehicle safety and crash avoidance system 252 may include functionality that performs safety checks or oversight of various commands, planning, or other decisions of various layers, as well as human driver actions, that could impact vehicle and occupant safety. In some embodiments, a variety of safety parameters may be stored in memory and the vehicle safety and crash avoidance system 252 may compare a determined value (e.g., relative spacing to a nearby vehicle, distance from the roadway centerline, etc.) to corresponding safety parameter(s), and issue a warning or command if the safety parameter is or will be violated. For example, a vehicle safety and crash avoidance system 252 may determine the current or future separate distance between another vehicle (as refined by the sensor fusion and RWM management layer 212) and the vehicle (e.g., based on the world model refined by the sensor fusion and RWM management layer 212), compare that separation distance to a safe separation distance parameter stored in memory, and issue instructions to a driver to speed up, slow down or turn if the current or predicted separation distance violates the safe separation distance parameter. As another example, a vehicle safety and crash avoidance system 252 may compare a human driver's change in steering wheel angle to a safe wheel angle limit or parameter, and issue an override command and/or alarm in response to the steering wheel angle exceeding the safe wheel angle limit.

Figure 3:
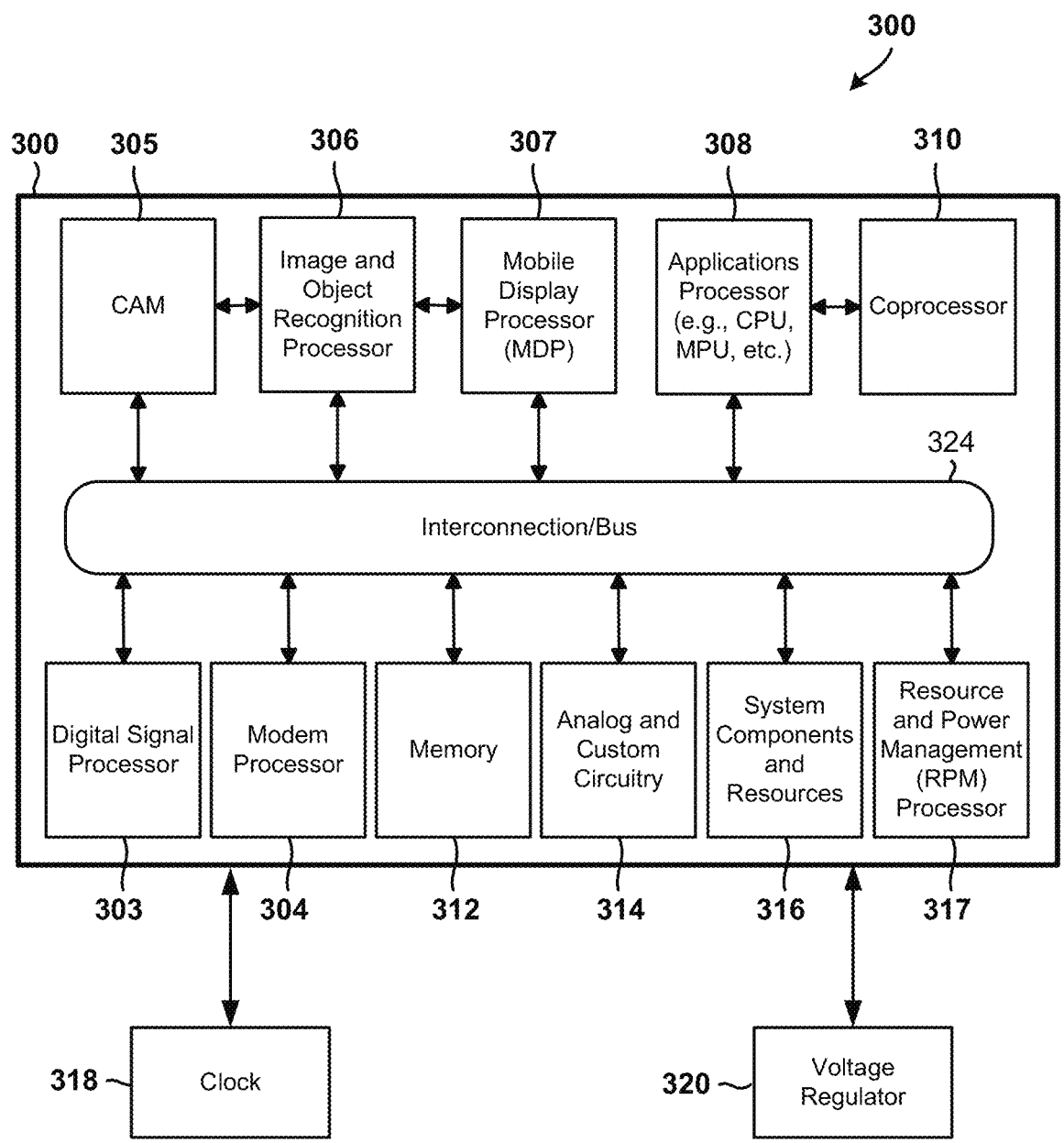
FIG. 3 is a block diagram illustrating components of an example system on chip for use in a vehicle that may be configured to broadcast, receive, and/or otherwise use intentions and/or motion plans in accordance with various embodiments.

FIG. 3 illustrates an example system-on-chip (SOC) architecture of a processing device SOC 300 suitable for implementing various embodiments in vehicles. With reference to FIGS. 1A-3, the processing device SOC 300 may include a number of heterogeneous processors, such as a digital signal processor (DSP) 303, a modem processor 304, an image and object recognition processor 306, a mobile display processor 307, an applications processor 308, and a resource and power management (RPM) processor 317. The processing device SOC 300 may also include one or more coprocessors 310 (e.g., vector co-processor) connected to one or more of the heterogeneous processors 303, 304, 306, 307, 308, 317. Each of the processors may include one or more cores, and an independent/internal clock. Each processor/core may perform operations independent of the other processors/cores. For example, the processing device SOC 300 may include a processor that executes a first type of operating system (e.g., FreeBSD®, LINUX®, OS X®, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), etc. The graphics processor 306 may be graphics processing unit (GPU).

The processing device SOC 300 may include analog circuitry and custom circuitry 314 for managing sensor data, analog-to-digital conversions, wireless data transmissions, and for performing other specialized operations, such as processing encoded audio and video signals for rendering in a web browser. The processing device SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 300 also include specialized circuitry for camera actuation and management (CAM) 305 that includes, provides, controls and/or manages the operations of one or more cameras 122, 136 (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

In some embodiments, the image and object recognition processor 306 may be configured with processor-executable instructions and/or specialized hardware configured to perform image processing and object recognition analyses involved in various embodiments. For example, the image and object recognition processor 306 may be configured to perform the operations of processing images received from cameras (e.g., 122, 136) via the CAM 305 to recognize and/or identify other vehicles, and otherwise perform functions of the camera perception layer 204 as described. In some embodiments, the processor 306 may be configured to process radar or lidar data and perform functions of the radar perception layer 202 as described.

The system components and resources 316, analog and custom circuitry 314, and/or CAM 305 may include circuitry to interface with peripheral devices, such as cameras 122, 136, radar 132, lidar 138, electronic displays, wireless communication devices, external memory chips, etc. The processors 303, 304, 306, 307, 308 may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high-performance networks-on chip (NoCs).

The processing device SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., a DSP 303, a modem processor 304, a graphics processor 306, an applications processor 308, etc.).

In some embodiments, the processing device SOC 300 may be included in a control unit (e.g., 140) for use in a vehicle (e.g., 100). The control unit may include communication links for communication with a telephone network (e.g., 180), the Internet, and/or a network server (e.g., 184) as described.

The processing device SOC 300 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, Wi-Fi®, etc.), and other well-known components of modern electronic devices.

Figure 4:
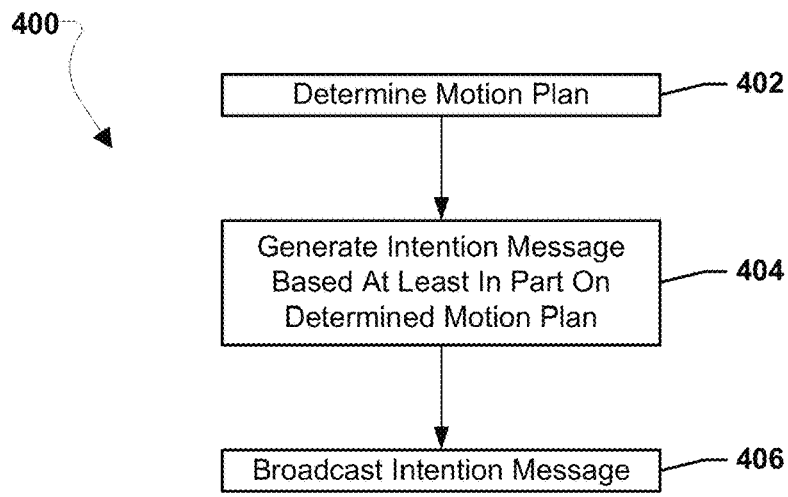
FIG. 4 is a process flow diagram illustrating a method of broadcasting an intention message according to various embodiments.

FIG. 4 illustrates a method 400 of broadcasting an intention message according to various embodiments. With reference to FIGS. 1A-4, the method 400 may be implemented in a processor (e.g., 164), a processing device (e.g., 300), and/or a control unit (e.g., 104) (variously referred to as a "processor") of a vehicle (e.g., 100). In some embodiments, the method 400 may be performed by one or more layers within a vehicle management system stack, such as a vehicle management stack 200, a vehicle management stack 250, etc. In other embodiments, the method 400 may be performed by a processor independently from, but in conjunction with, a vehicle control system stack, such as a vehicle management stack 200, a vehicle management stack 250, etc. For example, the method 400 may be implemented as a stand-alone software module or within dedicated hardware that monitors data and commands from/within the vehicle management system stack (e.g., vehicle management stack 200, 250, etc.) and is configured to take actions and store data as described.

In block 402, the processor may determine a motion plan for the vehicle. In various embodiments, a motion plan may include a position and an indication of how the position over time to is expected to change. In some embodiments, a motion plan may include a trajectory. An autonomous or semi-autonomous vehicle may know its current position and the direction and/or next action the autonomous or semi-autonomous vehicle may take to arrive at a next position at a next time. For example, the autonomous vehicle may have a trajectory to get to a next point from a current point. In various embodiments, a motion plan may include a trajectory and one or more vehicle descriptors associated with the vehicle and/or the vehicle owner and/or operator. For example, vehicle descriptors may include sensor perceptible attributes of the vehicle, such as vehicle color, vehicle license plate number, vehicle size, etc. As a further example, vehicle descriptors may include vehicle physical capabilities, such as vehicle type, vehicle turning radius, vehicle top speed, vehicle maximum acceleration, etc. As a still further example, vehicle descriptors may include vehicle location attributes, such as the vehicle's latitude & longitude, the vehicle's distance from, and/or orientation to, a known landmark in a coordinate plane, etc. In some embodiments, a motion plan may include an indication of an expected next position at a certain time. In some embodiments, a motion plan may include a motion vector. In some embodiments, a motion plan may include an indication of the coordinate plane used for determining the indicated position. In various embodiments, the motion plan may describe features of the vehicle transmitting the motion plan, such as its size, orientation, color, vehicle type, etc. In various embodiments, the motion plan may indicate the speed of the vehicle transmitting the motion plan, orientation of the vehicle transmitting the motion plan, acceleration of the vehicle transmitting the motion plan, or any other state information of the vehicle transmitting the motion plan. In various embodiments, the motion plan may indicate future actions (or intentions) of the vehicle, such as "turning on left blinker in five seconds", "turning right in two seconds", "braking in one hundred feet", or any other type actions or intentions relevant to driving.

In block 404, the processor may generate an intention message based at least in part on the determined motion plan. In various embodiments, an intention message may include an identifier of the vehicle broadcasting the intention message, the current position of the vehicle broadcasting the intention message, the motion plan of the vehicle broadcasting the intention message, and/or other data related to the vehicle broadcasting the intention message.

In block 406, the processor may broadcast the intention message. In various embodiments, intention messages may be broadcast from an autonomous vehicle, such as by C-V2X transmission modes. In various embodiments, intention messages may be broadcast periodically, such as at a set time interval, in response to a change in intention of a broadcasting vehicle, etc.

Figure 5:
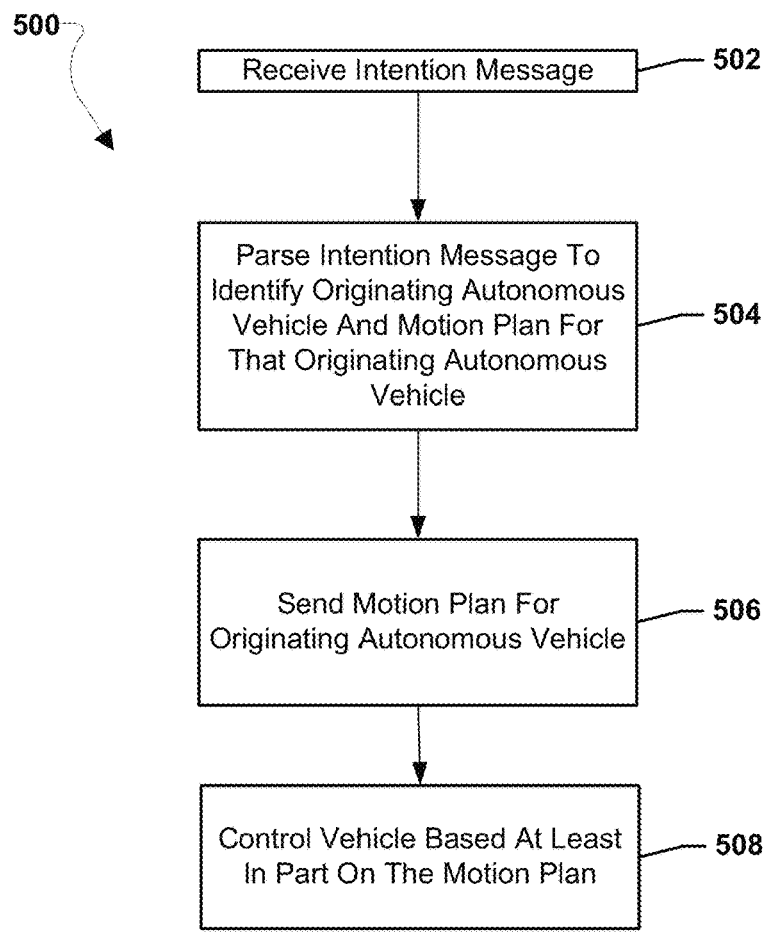
FIG. 5 is a process flow diagram illustrating a method of extracting a motion plan from a broadcast intention message according to various embodiments.

FIG. 5 illustrates a method 500 of extracting a motion plan from a broadcast intention message according to various embodiments. With reference to FIGS. 1A-5, the method 500 may be implemented in a processor (e.g., 164), a processing device (e.g., 300), and/or a control unit (e.g., 104) (variously referred to as a "processor") of a vehicle (e.g., 100). In some embodiments, the method 500 may be performed by one or more layers within a vehicle management system stack, such as a vehicle management stack 200, a vehicle management stack 250, etc. In other embodiments, the method 500 may be performed by a processor independently from, but in conjunction with, a vehicle control system stack, such as a vehicle management stack 200, a vehicle management stack 250, etc. For example, the method 500 may be implemented as a stand-alone software module or within dedicated hardware that monitors data and commands from/within the vehicle management system stack (e.g., vehicle management stack 200, 250, etc.) and is configured to take actions and store data as described. In various embodiments, the operations of method 500 may be performed in conjunction with the operations of method 400 (FIG. 4).

In block 502, the processor may receive an intention message. In various embodiments, broadcast intention messages may be received by any vehicle within transmission range of the vehicles broadcasting such intention messages. In various embodiments, the intention message may be received via C-V2X transmissions from a broadcasting vehicle.

In block 504, the processor may parse the intention message to identify the autonomous (or semi-autonomous) vehicle transmitting the intention message (the "transmitting vehicle") and a motion plan for that transmitting vehicle. In various embodiments, a vehicle, such as an autonomous vehicle, a semi-autonomous vehicle, a non-autonomous vehicle, etc., may parse the received intention message to determine the broadcasting vehicle's identifier, the current position of the intention message, and the motion plan, and/or any other information indicated within the intention message. In various embodiments, the motion plan may include a trajectory and one or more vehicle descriptors associated with the vehicle and/or the vehicle owner and/or operator. For example, vehicle descriptors may include sensor perceptible attributes of the vehicle, such as vehicle color, vehicle license plate number, vehicle size, etc. As a further example, vehicle descriptors may include vehicle physical capabilities, such as vehicle type, vehicle turning radius, vehicle top speed, vehicle maximum acceleration, etc. As a still further example, vehicle descriptors may include vehicle location attributes, such as the vehicle's latitude & longitude, the vehicle's distance from, and/or orientation to, a known landmark in a coordinate plane, etc.

In block 506, the processor may send the motion plan for the transmitting vehicle. In various embodiments, the broadcasting vehicle's identifier, the current position of the intention message, and the motion plan, and/or any other information indicated within the intention message may be provided to various hardware and software components of the receiving vehicle. For example, the broadcasting vehicle's identifier, the current position of the intention message, the motion plan, and/or any other information indicated within the intention message may be stored in one or more memory locations on the receiving vehicle, may be sent to one or more layers of a vehicle management system stack, etc.

In block 508, the processor may control the vehicle based at least in part on the motion plan. For example, using the broadcasting vehicle's identifier, the current position of the intention message, the motion plan, and/or any other information indicated within the intention message, the vehicle management system stack may control the operations of the vehicle. In various embodiments, motion plans may be used by one or more various layers of the vehicle management system stack to augment various decision making and/or autonomous driving operations. As examples, a received motion plan may be used by the vehicle management system stack in: sensor fusion processing; behavior prediction; behavioral planning; motion planning; position localization;

and/or sharing the burden of safety operations between autonomous vehicles. As specific examples, the motion plan may be used to control the operations of the vehicle in various embodiment methods described herein (e.g., method 400 (FIG. 4), method 500 (FIG. 5), method 600 (FIG. 6), method 700 (FIG. 7), method 800 (FIG. 8A), method 850 (FIG. 8B), method 900 (FIG. 9), and/or method 1000 (FIG. 10)).

Figure 6:
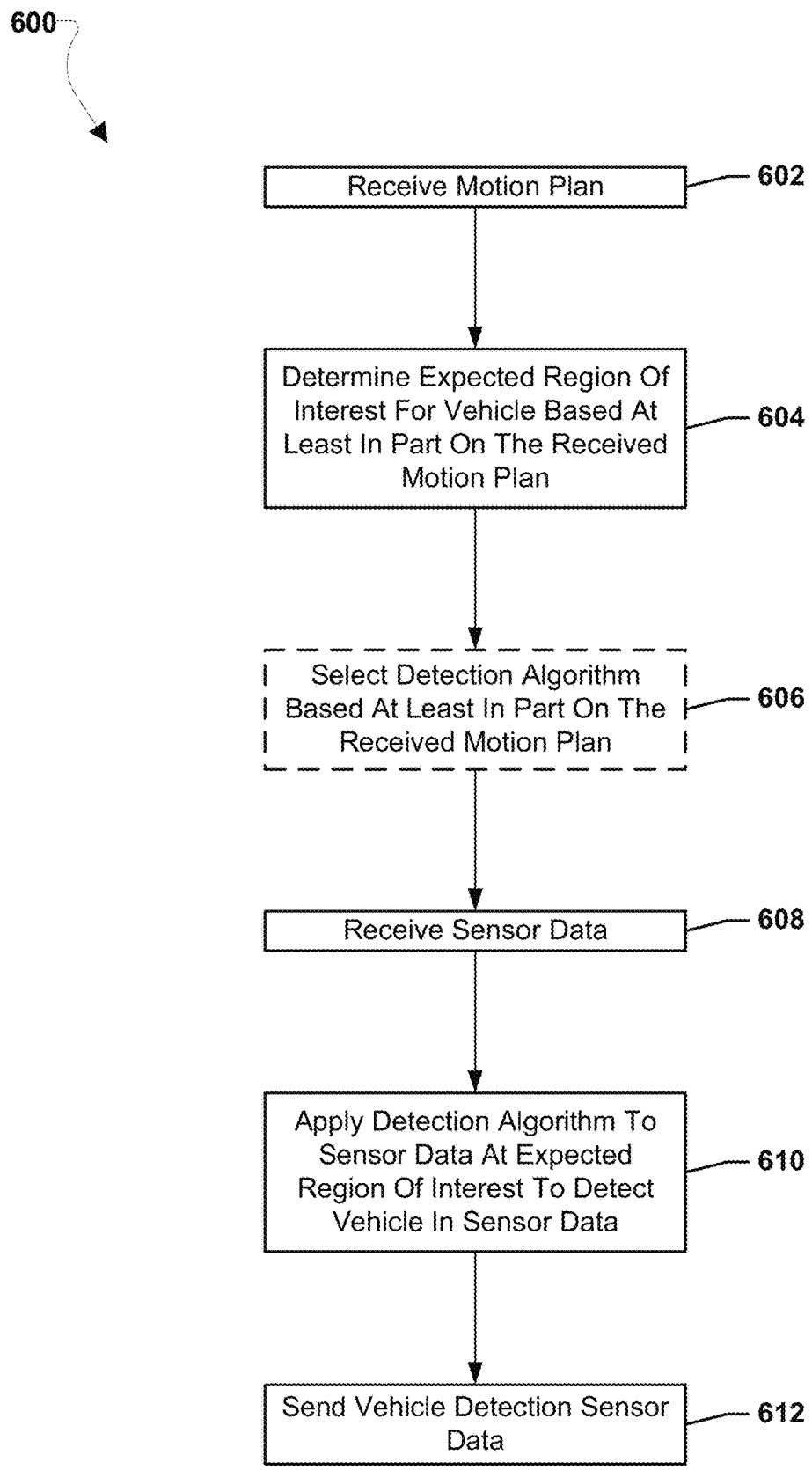
FIG. 6 is a process flow diagram illustrating a method of using a broadcast motion plan in sensor perception operations according to various embodiments.

FIG. 6 illustrates a method 600 of using a broadcast motion plan in sensor perception operations according to various embodiments. With reference to FIGS. 1A-6, the method 600 may be implemented in a processor (e.g., 164), a processing device (e.g., 300), and/or a control unit (e.g., 104) (variously referred to as a "processor") of a vehicle (e.g., 100). In some embodiments, the method 600 may be performed by one or more layers within a vehicle management system stack, such as a vehicle management stack 200, a vehicle management stack 250, etc. For example, some or all of operations of the method 600 may be performed as part of a perception functions implemented within the camera perception layer 204 and/or radar perception layer 202. In other embodiments, the method 600 may be performed by a processor independently from, but in conjunction with, the vehicle management system stack, such as the vehicle management stack 200, the vehicle management stack 250, etc. For example, the method 600 may be implemented as a stand-alone software module or within dedicated hardware that monitors data and commands from/within the vehicle management system stack (e.g., vehicle management system stack 200, 250, etc.) and is configured to take actions and store data as described. In various embodiments, the operations of method 600 may be performed in conjunction with the operations of method 400 (FIG. 4) and/or method 500 (FIG. 5). In various embodiments, the operations of the method 600 may be example operations to control a vehicle based at least in part on a motion plan.

In block 602, the processor may receive a motion plan. A motion plan may be received in various manners, such as in a message received from another component, retrieving the motion plan from a memory location (e.g., a cache, etc.) used for storing motion plans, in response to a request for a motion plan, etc. In various embodiments, a motion plan may include a trajectory and one or more vehicle descriptors associated with the vehicle and/or the vehicle owner and/or operator. For example, vehicle descriptors may include sensor perceptible attributes of the vehicle, such as vehicle color, vehicle license plate number, vehicle size, etc. As a further example, vehicle descriptors may include vehicle physical capabilities, such as vehicle type, vehicle turning radius, vehicle top speed, vehicle maximum acceleration, etc. As a still further example, vehicle descriptors may include vehicle location attributes, such as the vehicle's latitude and longitude, the vehicle's distance from, and/or orientation to, a known landmark in a coordinate plane, etc.

In block 604, the processor may determine an expected region of interest for a vehicle based at least in part on the received motion plan. Being able to focus on a specific region of interest in the data in the space around the vehicle because an object, such as the motion plan broadcasting vehicle, is expected in that region of interest may increase the speed of detection of that vehicle when compared with analyzing the data as a whole. In various embodiments, the motion plan may be used to determine the region of interest to apply to the raw sensor data to perceive a vehicle in that raw sensor data.

In optional block 606, the processor may select a detection algorithm based at least in part on the received motion plan. In some embodiments, the motion plan may be used to select and/or modify the algorithm used to perceive vehicles in the raw sensor data. For example, a different algorithm may be used when the motion plan broadcasting vehicle is expected to be head on to the receiving vehicle than when the motion plan broadcasting vehicle is expected to be perpendicular to the receiving vehicle. As a further example, a different detection threshold may be used depending on whether a motion plan indicates the broadcasting vehicle is expected to be in a given space. As a specific example, without a motion plan a receiving vehicle may only report detections that pass with a 90% confidence, while with a motion plan the receiving vehicle may report detections that pass a 50% confidence in a region of interest associated with the motion plan. Block 606 may be optional, as the detection algorithm may not change in some embodiments.

In block 608, the processor may receive sensor data. The sensor data may be raw sensor data received from one or more sensors, such as cameras, LIDARs, radars, etc.

In block 610, the processor may apply the detection algorithm to the sensor data at the expected region of interest to detect the vehicle in the sensor data. Sensor perception may include operations to control where a sensor looks in the region of interest to confirm a detection of an object, such as another vehicle. A motion plan that indicates vehicle descriptors which sensor perceptible attributes, may enable a vehicle management system to focus one or more sensors on a specific sensor perceptible attribute, such as cueing an image sensor to look for a particular vehicle color, vehicle size, etc. This may increase the speed of detection by sensors and the vehicle management system of that other vehicle compared to analyzing the entirety of sensor data as a whole. In some embodiments, the motion plan may be used by the vehicle management system to confirm whether or not a specific vehicle is perceived in the raw sensor data. For example, the detection in raw sensor data of a sensor perceptible attribute of a vehicle that was included in a motion plan as a vehicle descriptor (e.g., the vehicle's color, vehicle's license plate number, etc.) may confirm that the vehicle transmitting the motion plan is the vehicle perceived by vehicle sensors in a region of interest.

In block 612, the processor may send the vehicle detection sensor data. For example, the vehicle detection sensor data may be sent to the sensor fusion and RWM management layer 212.

Figure 7:
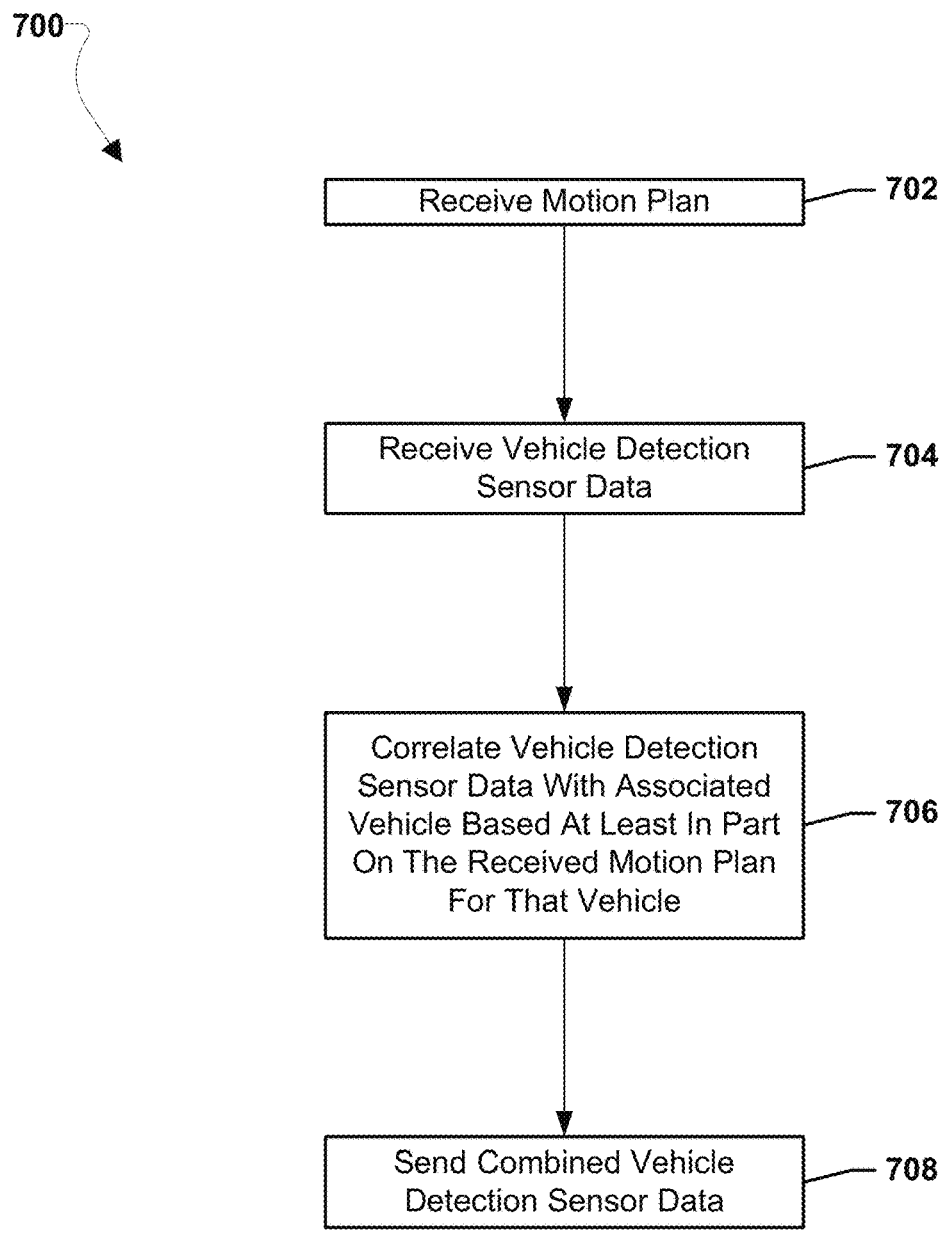
FIG. 7 is a process flow diagram illustrating a method of using a broadcast motion plan in sensor fusion operations according to various embodiments.

FIG. 7 illustrates a method 700 of using a broadcast motion plan in sensor fusion operations according to various embodiments. With reference to FIGS. 1A-7, the method 700 may be implemented in a processor (e.g., 164), a processing device (e.g., 300), and/or a control unit (e.g., 104) (variously referred to as a "processor") of a vehicle (e.g., 100). In some embodiments, the method 700 may be performed by one or more layers within a vehicle management system stack, such as a vehicle management system stack 200, a vehicle management system stack 250, etc. For example, some or all of operations of the method 700 may be performed as part of a sensor fusion functions implemented within the sensor fusion and RWM management layer 212. In other embodiments, the method 700 may be performed by a processor independently from, but in conjunction with, the vehicle management system stack, such as the vehicle management system stack 200, the vehicle management system stack 250, etc. For example, the method 700 may be implemented as a stand-alone software module or within dedicated hardware that monitors data and commands from/within the vehicle management system stack (e.g., vehicle management system stack 200, 250, etc.) and is configured to take actions and store data as described. In various embodiments, the operations of method 700 may be performed in conjunction with the operations of method 400 (FIG. 4), method 500 (FIG. 5), and/or method 600 (FIG. 6). In various embodiments, the operations of method 700 may be example operations to control a vehicle based at least in part on a motion plan.

In block 702, the processor may receive a motion plan. A motion plan may be received in various manners, such as in a message received from another component, retrieving the motion plan from a memory location (e.g., a cache, etc.) used for storing motion plans, in response to a request for a motion plan, etc. In various embodiments, a motion plan may include a trajectory and one or more vehicle descriptors associated with the vehicle and/or the vehicle owner and/or operator. For example, vehicle descriptors may include sensor perceptible attributes of the vehicle, such as vehicle color, vehicle license plate number, vehicle size, etc. As a further example, vehicle descriptors may include vehicle physical capabilities, such as vehicle type, vehicle turning radius, vehicle top speed, vehicle maximum acceleration, etc. As a still further example, vehicle descriptors may include vehicle location attributes, such as the vehicle's latitude & longitude, the vehicle's distance from and/or orientation to a known landmark in a coordinate plane, etc.

In block 704, the processor may receive vehicle detection sensor data. For example, the processor may receive vehicle detection sensor data from the camera perception layer 204 and/or radar perception layer 202.

In block 706, the processor may correlate vehicle detection sensor data with an associated vehicle based at least in part on the received motion plan for that vehicle. In various embodiments, correlating vehicle detection sensor data with an associated vehicle based at least in part on the received motion plan for that vehicle may include operations to combine and associate sensor data and associate that sensor data with a tracked object. A motion plan may improve the performance of data association and tracking operations of a sensor fusion layer of a vehicle management system. The vehicle management system may use the motion plan to determine how to fuse all the raw detections of other vehicles in an environment together. For example, based on the motion plan broadcast for a vehicle, the receiving vehicle may be enabled to determine a radar detection, a LIDAR detection, and a camera detection are actually all the same vehicle because the detections all correlate to the motion plan for that vehicle rather than considering the three detections separate vehicles. As a specific example, different sensors of the receiving vehicle positively identifying one or more sensor perceptible attributes of a vehicle included in a received motion plan may confirm that the sensors are detecting the vehicle that transmitted the motion plan. Additionally, the motion plan may enable the receiving vehicle to determine that those vehicle detections will evolve together. The ability to compare vehicle detections to motion plans may enable outlier measurements to be discarded. For example, a tracked vehicle's motion plan indicating it intends to stay in a current lane may enable a detection not corresponding to that lane to be associated with a new object rather than the previously tracked vehicle. The presence of a motion plan may reduce uncertainty in the sensor fusion operations. The noisy detections from the perception layer may be compared with the underlying trajectories in a motion plan to give an improved certainty to sensor fusion operations.

In block 708, the processor may send combined vehicle detection sensor data. For example, the processor may send the combined vehicle detection sensor data to a behavioral planning and prediction layer 216, vehicle safety and crash avoidance system 252, and/or motion planning and control layer 214.

Figure 8A:
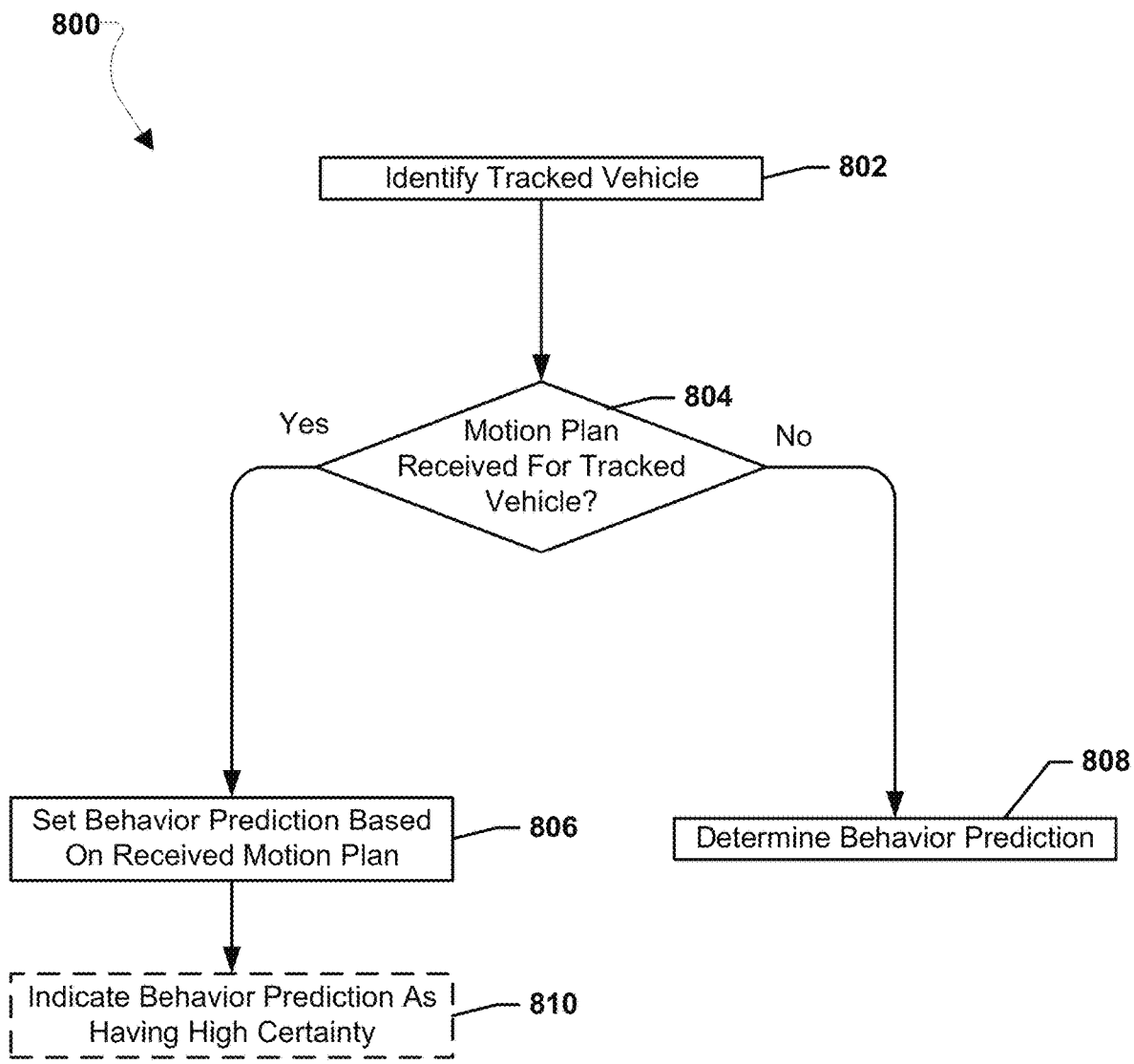
FIG. 8A is a process flow diagram illustrating a method of using a broadcast motion plan in behavior prediction operations according to various embodiments.

FIG. 8A illustrates a method 800 of using a broadcast motion plan in behavior prediction operations according to various embodiments. With reference to FIGS. 1A-8A, the method 800 may be implemented in a processor (e.g., 164), a processing device (e.g., 300), and/or a control unit (e.g., 104) (variously referred to as a "processor") of a vehicle (e.g., 100). In some embodiments, the method 800 may be performed by one or more layers within a vehicle management system stack, such as a vehicle management system stack 200, a vehicle management system stack 250, etc. For example, some or all of operations of the method 800 may be performed as part of a behavioral prediction functions implemented within the behavioral planning and prediction layer 216. In other embodiments, the method 800 may be performed by a processor independently from, but in conjunction with, the vehicle management system stack, such as the vehicle management system stack 200, the vehicle management system stack 250, etc. For example, the method 800 may be implemented as a stand-alone software module or within dedicated hardware that monitors data and commands from/within the vehicle management system stack (e.g., vehicle management system stack 200, 250, etc.) and is configured to take actions and store data as described. In various embodiments, the operations of method 800 may be performed in conjunction with the operations of method 400 (FIG. 4), method 500 (FIG. 5), method 600 (FIG. 6), and/or method 700 (FIG. 7). In various embodiments, the operations of method 800 may be example operations to control a vehicle based at least in part on a motion plan.

In block 802, the processor may identify a tracked vehicle. For example, the processor may select a next tracked vehicle in a list of tracked vehicle currently perceived in the environment based on data from the sensor fusion and RWM management layer 212.

In determination block 804, the processor may determine whether the motion plan has been received for the tracked vehicle. For example, the processor may compare the tracked vehicle identifier to the identifiers of motion plans stored in a memory to determine whether a motion plan has been received for the tracked vehicle. In some embodiments, when a motion plan is received, the motion plan may include vehicle descriptors that reflect vehicle physical capabilities of the vehicle transmitting the motion plan.

In response to determining that the motion plan has not been received (i.e., determination block 804="No"), the processor may determine a behavior prediction in block 808. In this manner, even though no intention messages are received, the processor may revert to making the vehicle fully responsible for full inference of the state of the world by determining a behavior prediction. In a similar manner as described with reference to blocks 804 and 808 of the method 800 (FIG. 8A), the other embodiment methods described herein (e.g., method 400 (FIG. 4), method 500 (FIG. 5), method 600 (FIG. 6), method 700 (FIG. 7), method 900 (FIG. 9), and/or method 1000 (FIG. 10)), may optionally include operations to conditionally take actions (and/or make determinations) based on one or more available motion plans when such broadcast motion plans are available and to default to other actions (and/or make other determinations) when no such broadcast motion plans are received. In various embodiments, for example, when no intention messages (or motion plans) are received, the processor may revert to making the vehicle fully responsible for full inference of the state of the world to enable taking actions (and/or making determinations).

In response to determining that the motion plan has been received (i.e., determination block 804="Yes"), the processor may set a behavior prediction based on the received motion plan in block 806. The presence of a motion plan broadcast by a vehicle may enable a vehicle receiving that motion plan to predict the behavior of that vehicle with a known certainty. The benefit of a motion plan and a position may be that the motion plan may be treated as the predicted behavior of that vehicle. This certainty in behavior prediction may reduce the dimensionality of the POMDP by knowing behavioral/trajectory prediction exactly for surrounding cars that broadcast their respective motion plans. Sharing the motion plan may result in behavioral predictions with no uncertainty. Additionally, knowing the intended motion of a vehicle may eliminate the need to estimate that vehicle's motion, thereby reducing the computational resources associated with behavior prediction. Additionally, a motion plan including vehicle descriptors that reflect vehicle physical capabilities of the vehicle transmitting the motion plan may reduce the space of possibilities for behavioral planning searches within a vehicle behavior model by limiting the possible behaviors of the transmitting vehicle to those within that vehicle's capabilities. For example, a type of vehicle indicated in a motion plan may be used to constrain a maximum speed or acceleration of the vehicle based on the maximum speed or acceleration associated with that vehicle type. As another example, a turning radius of the vehicle indicated in a motion plan may be used to constrain the potential turning paths of the vehicle transmitting the motion plan to within the indicated turning radius.

In optional block 810, the processor may indicate the behavior prediction as having a high certainty. For example, the certainty may be high as the broadcasting vehicle affirmatively indicated its intention in its motion plan and the behavior prediction was set to that indicated intention.

In various embodiments, behavior predictions based on the motion plan of a broadcasting vehicle may be used for behavioral planning and/or motion planning with a high degree of certainty. In various embodiments, a behavioral planning layer may provide a high-level driving goal to a motion planning layer. The motion planning layer may be responsible for actually planning the trajectory to execute that high-level maneuver and the motion planning layer may be responsible for ensuring the safety of executing that trajectory. The presence of a motion plan broadcast by another vehicle in the environment may enable the motion planning layer to perform fewer collision checks as a result of prediction of the motion of that broadcasting vehicle being known with certainty. Collision checking is often a bottleneck of fast motion planning, so fewer checks may greatly speed up the overall autonomous driving algorithm.

Figure 8B:
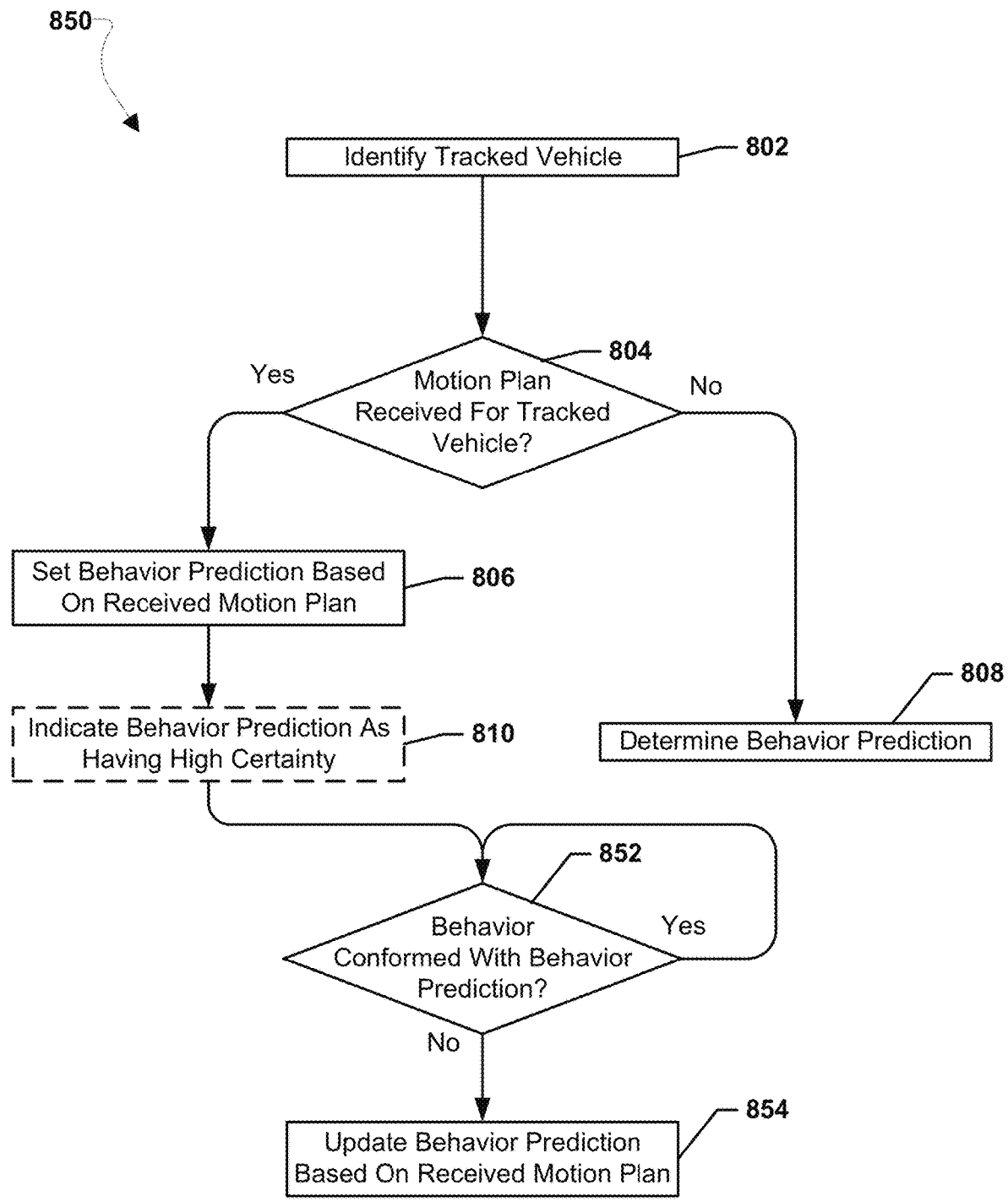
FIG. 8B is a process flow diagram illustrating a method of using a broadcast motion plan in behavior prediction operations according to various embodiments.

FIG. 8B illustrates a method 850 of using a broadcast motion plan in behavior prediction operations according to various embodiments. With reference to FIGS. 1A-8B, the method 850 may be implemented in a processor (e.g., 164), a processing device (e.g., 300), and/or a control unit (e.g., 104) (variously referred to as a "processor") of a vehicle (e.g., 100). In some embodiments, the method 850 may be performed by one or more layers within a vehicle management system stack, such as a vehicle management system stack 200, a vehicle management system stack 250, etc. For example, some or all of operations of the method 850 may be performed as part of behavioral prediction functions implemented within the behavioral planning and prediction layer 216. In other embodiments, the method 850 may be performed by a processor independently from, but in conjunction with, the vehicle management system stack, such as the vehicle management system stack 200, the vehicle management system stack 250, etc. For example, the method 850 may be implemented as a stand-alone software module or within dedicated hardware that monitors data and commands from/within the vehicle management system stack (e.g., vehicle management system stack 200, 250, etc.) and is configured to take actions and store data as described. In various embodiments, the operations of method 850 may be performed in conjunction with the operations of method 400 (FIG. 4), method 500 (FIG. 5), method 600 (FIG. 6), and/or method 700 (FIG. 7). In various embodiments, the operations of the method 850 may be example operations to control a vehicle based at least in part on a received motion plan.

In blocks 802, 804, 806, 808, and 810, the processor may perform like operations of like numbered blocks of method 800 (FIG. 8A) described above.

In determination block 852, the processor may determine whether the behavior of the tracked other vehicle conformed with the behavior prediction by the behavioral planning and prediction layer 216. For example, the processor may compare sensor data associated with the tracked vehicle to the behavior prediction by the behavioral planning and prediction layer to determine whether the tracked vehicle is at an expected location per the behavior prediction. The sensor data indicating the tracked vehicle is located where expected may indicate that the behavior of the tracked vehicle conformed to the behavior prediction. The sensor data indicating the tracked vehicle is not located where expected may indicate that the behavior of the tracked vehicle did not conform to the behavior prediction.

In response to determining that the behavior conformed to the behavior prediction (i.e., determination block 852="Yes"), the processor may continue to monitor the behavior of the tracked vehicle and continuously or periodically determine whether the behavior conformed to the behavior prediction in determination block 852. In this manner, processor may repeatedly check for non-conforming behavior of the tracked vehicle.

In response to determining that the behavior did not conform to the behavior prediction (i.e., determination block 852="No"), the processor may update the behavior prediction or the vehicle behavior model based on information in the received motion plan in block 854. In various embodiments, receiving a motion plan broadcast by a vehicle including vehicle descriptors that reflect vehicle physical capabilities of the vehicle transmitting the motion plan may reduce the space of possibilities for behavioral planning searches by or within a vehicle behavior model after a vehicle deviates from a behavior prediction. In response to determining that a vehicle's behavior does not conform to a behavior prediction, the behavior prediction or the vehicle behavior model for that vehicle may be updated based at least in part on information in the received motion plan. For example, vehicle physical capabilities identified in the received motion plan may be used by or within a vehicle behavior model to collapse the possible future behaviors of the vehicle from a POMDP to an MDP analysis in which there are a host of solutions suitable for online and real-time operations. For example, a type of vehicle indicated in a motion plan may be used to constrain a maximum speed or acceleration of the vehicle used in a vehicle behavior model that is then used to update the behavior prediction based on the maximum speed or acceleration associated with that vehicle type. As another example, a turning radius of the vehicle indicated in a motion plan may be used in a vehicle behavior model to constrain the potential turning paths of the vehicle transmitting the motion plan to within the indicated turning radius used in updating the behavior prediction.

Figure 9:
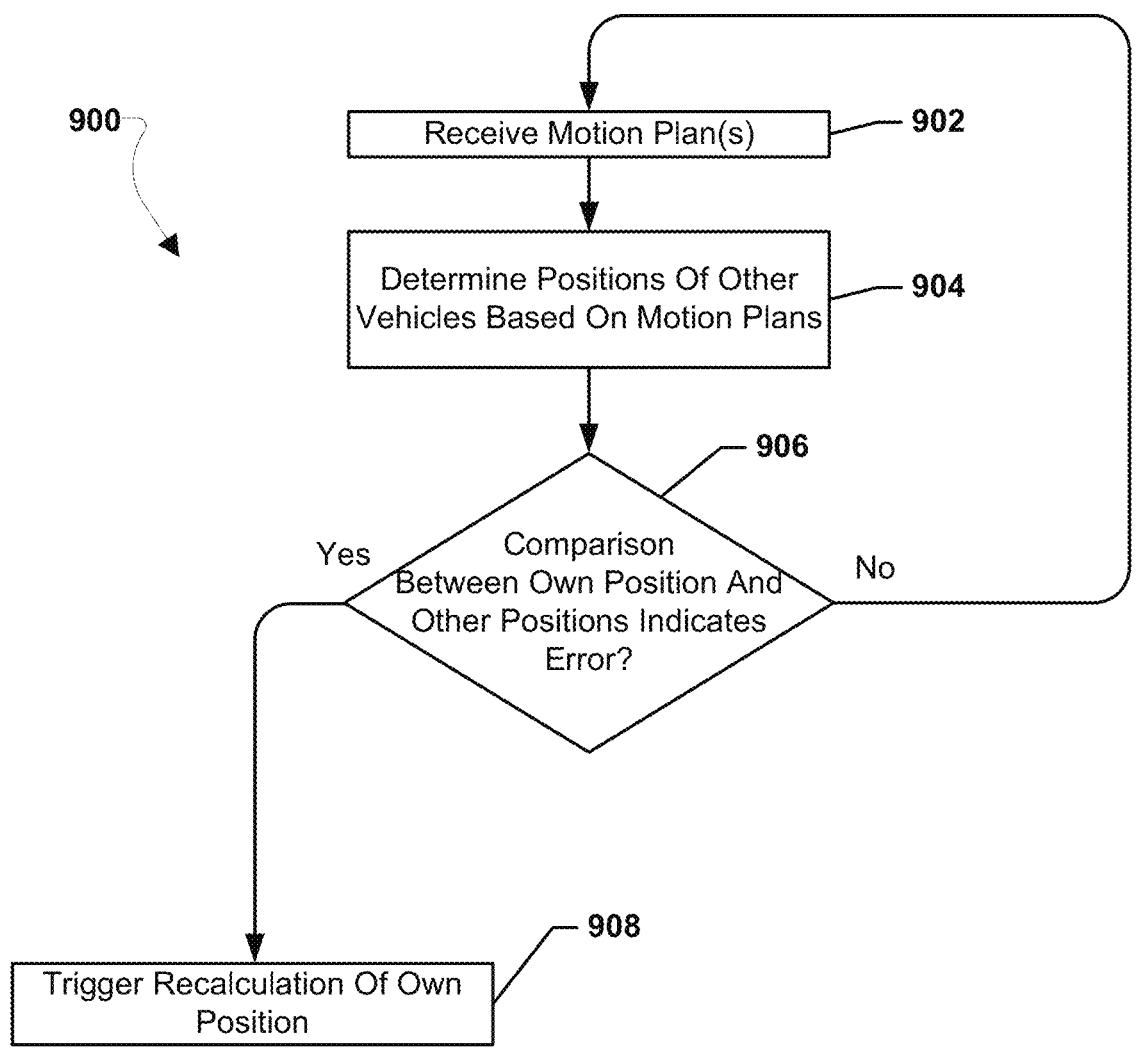
FIG. 9 is a process flow diagram illustrating a method of using a broadcast motion plan in position localization operations according to various embodiments.

FIG. 9 illustrates a method 900 of using a broadcast motion plan in position localization operations according to various embodiments. With reference to FIGS. 1A-9, the method 900 may be implemented in a processor (e.g., 164), a processing device (e.g., 300), and/or a control unit (e.g., 104) (variously referred to as a "processor") of a vehicle (e.g., 100). In some embodiments, the method 900 may be performed by one or more layers within a vehicle management system stack, such as a vehicle management system stack 200, a vehicle management system stack 250, etc. For example, some or all of operations of the method 900 may be performed as part of a localization functions implemented within the map fusion and arbitration layer 208. In other embodiments, the method 900 may be performed by a processor independently from, but in conjunction with, the vehicle management system stack, such as the vehicle management system stack 200, the vehicle management system stack 250, etc. For example, the method 900 may be implemented as a stand-alone software module or within dedicated hardware that monitors data and commands from/within the vehicle management system stack (e.g., vehicle management system stack 200, 250, etc.) and is configured to take actions and store data as described. In various embodiments, the operations of method 900 may be performed in conjunction with the operations of method 400 (FIG. 4), method 500 (FIG. 5), method 600 (FIG. 6), method 700 (FIG. 7), method 800 (FIG. 8A), and/or method 850 (FIG. 8B). In various embodiments, the operations of method 900 may be example operations to control a vehicle based at least in part on a motion plan.

In block 902, the processor may receive one or more motion plans. Motion plans may be received in various manners, such as in messages received from another component, retrieving the motion plans from a memory location (e.g., a cache, etc.) used for storing motion plans, in response to a request for motion plans, etc. In various embodiments, a motion plan may include a trajectory and one or more vehicle descriptors associated with the vehicle and/or the vehicle owner and/or operator as described.

In block 904, the processor may determine positions of other vehicles based on their respective motion plans. In various embodiments, intention messages and/or motion plans broadcast by vehicles may indicate those vehicles distance from, and/or orientation to, a known landmark in a coordinate plan, such as a local and/or global coordinate plane. For example, a motion plan may indicate the transmitting vehicle's distance from and/or orientation to a known landmark in a coordinate plane, such as a local and/or global coordinate plane, in a vehicle location attribute type vehicle descriptor. The processor may determine the positions and/or relative distances from a known landmark for the other vehicles broadcasting motion plans to determine positions of other vehicles based on their respective motion plans.

In determination block 906, the processor may determine whether a comparison between the vehicle's own position and other vehicle positions indicates an error. A vehicle, such as an autonomous vehicle, a semi-autonomous vehicle, a non-autonomous vehicle, etc., receiving the indications from the broadcasting vehicles may compare its observations of those broadcasting vehicles and their position relative to the known landmark to the distance from the known landmark in the intention message and/or motion plan to assist in localization of the receiving vehicle. For example, the receiving vehicle may compare its own observations to those in the motion plans to determine whether there is an error or offset between its observations and those in the motion plans. An error or offset between its observations and those in the motion plans may indicate to the receiving vehicle that it has localized its respective current position incorrectly. As a specific example, two different autonomous vehicles may both broadcast their respective motion plans and those motion plans may be received by the receiving vehicle. Observations of a landmark in those two motion plans may match, but may be different from the observation of the receiving vehicle of that same landmark. The agreement of two observations in the different motion plans and their difference from the receiving vehicle's observations may indicate the receiving vehicle localized its position incorrectly.

In response to no error being indicated (i.e., determination block 906="No"), the processor may continue to receive motion plans in block 902.

In response to an error being indicated by the comparison between the vehicle's own position and other vehicle positions (i.e., determination block 906="Yes"), the processor may trigger a recalculation of the vehicle's own position in block 908.

Figure 10:
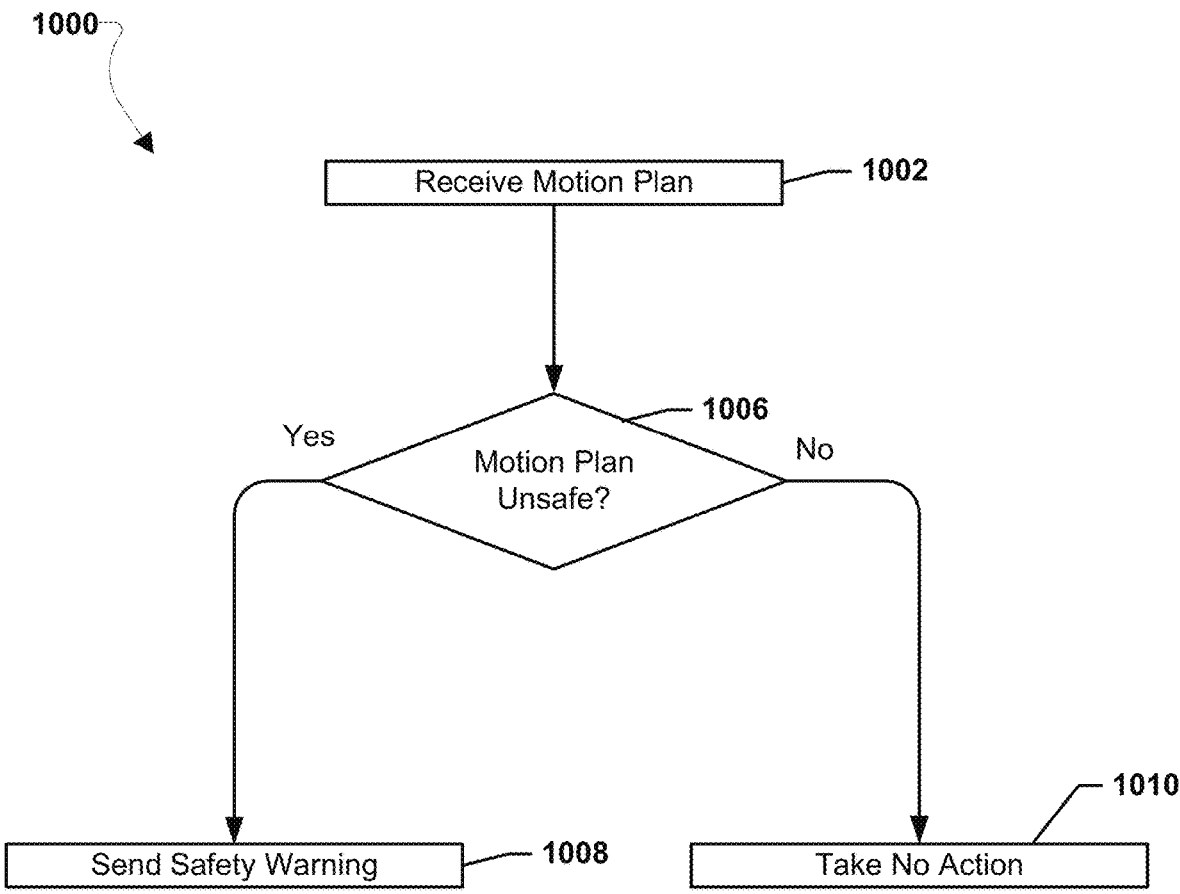
FIG. 10 is a process flow diagram illustrating a method of using a broadcast motion plan to share burden of safety operations between vehicles according to various embodiments.

FIG. 10 illustrates a method 1000 of using a broadcast motion plan to share the burden of safety operations according to various embodiments. With reference to FIGS. 1A-10, the method 1000 may be implemented in a processor (e.g., 164), a processing device (e.g., 300), and/or a control unit (e.g., 104) (variously referred to as a "processor") of a vehicle (e.g., 100). In some embodiments, the method 1000 may be performed by one or more layers within a vehicle management system stack, such as a vehicle management system stack 200, a vehicle management system stack 250, etc. For example, some or all of operations of the method 1000 may be performed as part of a safety functions implemented within the motion planning and control layer 214. In other embodiments, the method 1000 may be performed by a processor independently from, but in conjunction with, the vehicle management system stack, such as the vehicle management system stack 200, the vehicle management system stack 250, etc. For example, the method 1000 may be implemented as a stand-alone software module or within dedicated hardware that monitors data and commands from/within the vehicle management system stack (e.g., vehicle management system stack 200, 250, etc.) and is configured to take actions and store data as described. For example, some or all of operations of the method 1000 may be performed as part of a safety functions implemented within the vehicle safety and crash avoidance system 252. In various embodiments, the operations of method 1000 may be performed in conjunction with the operations of method 400 (FIG. 4), method 500 (FIG. 5), method 600 (FIG. 6), method 700 (FIG. 7), method 800 (FIG. 8), and/or method 900 (FIG. 9). In various embodiments, the operations of method 1000 may be example operations to control a vehicle based at least in part on a received motion plan.

In block 1002, the processor may receive a motion plan. A motion plan may be received in various manners, such as in a message received from another component, retrieving the motion plan from a memory location (e.g., a cache, etc.) used for storing motion plans, in response to a request for a motion plan, etc. In various embodiments, a motion plan may include a trajectory and one or more vehicle descriptors associated with the vehicle and/or the vehicle owner and/or operator as described.

In determination block 1006, the processor may determine whether the motion plan is unsafe. For example, the receiving vehicle may detect an object that will cause a motion plan of a broadcasting vehicle to be unsafe even though the broadcasting vehicle did not yet sense or otherwise observe that object. In response, the receiving vehicle may that determine the motion plan is unsafe.

In response to determining that the motion plan is safe (i.e., determination block 1006="No"), the processor may take no action in block 1010.

In response to determining that the motion plan is unsafe (i.e., determination block 1006="Yes"), the processor may send a safety warning to the other vehicle in block 1008. The warning may include the observation of the object causing the motion plan to be unsafe.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of various embodiments.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the scope of the embodiments. Thus, various embodiments are not intended to be limited to the embodiments shown herein but are to be accorded the widest scope consistent with the following claims and the principles and novel features disclosed herein.

What is claimed is:

1. A method of controlling a vehicle, comprising:
   receiving an intention message including a motion plan from a transmitting vehicle,
      wherein the motion plan comprises a trajectory of the transmitting vehicle and one or more vehicle descriptors associated with the transmitting vehicle and
      wherein the one or more vehicle descriptors comprise a vehicle physical capability,
      wherein the vehicle physical capability comprises at least one of a turning radius, a vehicle top speed, and a vehicle maximum acceleration;
   parsing the intention message to identify the motion plan for the transmitting vehicle;
   determining an expected region of interest for the vehicle based at least in part on the motion plan;
   selecting a first detection algorithm for detecting a sensor perceptible attribute of the transmitting vehicle based on receiving the motion plan of the transmitting vehicle, wherein the first detection algorithm is associated with a first confidence threshold for reporting detection of the transmitting vehicle in the expected region of interest,
wherein the first confidence threshold is lower than a second confidence threshold associated with a second detection algorithm;
receiving sensor data from one or more sensors disposed in or on the vehicle;
applying the selected first detection algorithm to a limited subset of received sensor data from the expected region of interest;
setting a future behavior prediction for the transmitting vehicle based at least in part on a vehicle behavior model for the transmitting vehicle limited by the vehicle physical capability and the expected region of interest, wherein setting the future behavior prediction for the transmitting vehicle is based on the application of the selected first detection algorithm; and
controlling the vehicle based at least in part on the motion plan and the future behavior prediction.

2. The method of claim 1, wherein the one or more vehicle descriptors comprise the sensor perceptible attribute.

3. The method of claim 1, wherein controlling the vehicle based at least in part on the motion plan and the future behavior prediction comprises:
applying the first detection algorithm to the received sensor data at the expected region of interest to detect the transmitting vehicle in the received sensor data based at least in part on the sensor perceptible attribute.

4. The method of claim 1, wherein:
the first confidence threshold is fifty percent confidence threshold, and the first detection algorithm reports detection of the sensor perceptible attribute based on confidence of the detection of the sensor perceptible attribute being above the fifty percent confidence threshold; and
the second confidence threshold is a ninety percent confidence threshold, and the second detection algorithm reports detection of the sensor perceptible attribute based on confidence of the detection of the sensor perceptible attribute being above the ninety percent confidence threshold.

5. The method of claim 1, wherein controlling the vehicle based at least in part on the motion plan and the future behavior prediction comprises:
correlating vehicle detection sensor data with the transmitting vehicle based at least in part on the sensor perceptible attribute.

6. The method of claim 1, further comprising:
determining whether a behavior of the transmitting vehicle conforms to the future behavior prediction; and
updating the future behavior prediction based at least in part on the vehicle physical capability in response to determining that the behavior of the transmitting vehicle does not conform to the future behavior prediction.

7. The method of claim 1, wherein the one or more vehicle descriptors comprise a vehicle location attribute.

8. The method of claim 7, wherein controlling the vehicle based at least in part on the motion plan and the future behavior prediction comprises:
determining a position of the transmitting vehicle based at least in part on the vehicle location attribute;
determining whether a comparison between a position of the vehicle and the position of the transmitting vehicle indicate an error; and triggering a recalculation of the position of the vehicle in response to determining the comparison between the position of the vehicle and the position of the transmitting vehicle indicate an error.

9. The method of claim 1, wherein controlling the vehicle based at least in part on the motion plan and the future behavior prediction comprises:
determining whether the motion plan is unsafe; and
sending a safety warning to the transmitting vehicle in response to determining the motion plan is unsafe.

10. The method of claim 1, wherein the vehicle behavior model for the transmitting vehicle is limited by the turning radius of the transmitting vehicle to constrain potential turning paths of the transmitting vehicle.

11. A processing device for use in a vehicle, the processing device configured to:
receive an intention message including a motion plan from a transmitting vehicle,
wherein the motion plan comprises a trajectory of the transmitting vehicle and one or more vehicle descriptors associated with the transmitting vehicle and wherein the one or more vehicle descriptors comprise a vehicle physical capability,
wherein the vehicle physical capability comprises at least one of a turning radius, a vehicle top speed, and a vehicle maximum acceleration;
parse the intention message to identify the motion plan for the transmitting vehicle;
determine an expected region of interest for the vehicle based at least in part on the motion plan;
select a first detection algorithm for detecting a sensor perceptible attribute of the transmitting vehicle based on receiving the motion plan of the transmitting vehicle,
wherein the first detection algorithm is associated with a first confidence threshold for reporting detection of the transmitting vehicle in the expected region of interest,
wherein the first confidence threshold is lower than a second confidence threshold associated with a second detection algorithm;
receive sensor data from one or more sensors disposed in or on the vehicle;
apply the selected first detection algorithm to a limited subset of received sensor data from the expected region of interest;
set a future behavior prediction for the transmitting vehicle based at least in part on a vehicle behavior model for the transmitting vehicle limited by the vehicle physical capability and the expected region of interest, wherein setting the future behavior prediction for the transmitting vehicle is based on the application of the selected first detection algorithm; and
control the vehicle based at least in part on the motion plan and the future behavior prediction.

12. The processing device of claim 11, wherein the one or more vehicle descriptors comprise the sensor perceptible attribute.

13. The processing device of claim 11, wherein the processing device is configured to control the vehicle based at least in part on the motion plan and the future behavior prediction by:
applying the first detection algorithm to the received sensor data at the expected region of interest to detect the transmitting vehicle in the received sensor data based at least in part on the sensor perceptible attribute.

14. The processing device of claim 11, wherein:
the first confidence threshold is fifty percent confidence threshold, and the first detection algorithm reports detection of the sensor perceptible attribute based on confidence of the detection of the sensor perceptible attribute being above the fifty percent confidence threshold; and
the second confidence threshold is a ninety percent confidence threshold, and the second detection algorithm reports detection of the sensor perceptible attribute based on confidence of the detection of the sensor perceptible attribute being above the ninety percent confidence threshold.

15. The processing device of claim 11, wherein the processing device is configured to control the vehicle based at least in part on the motion plan and the future behavior prediction by:
correlating vehicle detection sensor data with the transmitting vehicle based at least in part on the sensor perceptible attribute.

16. The processing device of claim 11, wherein the processing device is further configured to:
determine whether a behavior of the transmitting vehicle conforms to the future behavior prediction; and
update the future behavior prediction based at least in part on the vehicle physical capability in response to determining that the behavior of the transmitting vehicle does not conform to the behavior prediction.

17. The processing device of claim 11, wherein the one or more vehicle descriptors comprise a vehicle location attribute.

18. The processing device of claim 17, wherein the processing device is configured to control the vehicle based at least in part on the motion plan and the future behavior prediction by:
determining a position of the transmitting vehicle based at least in part on the vehicle location attribute;
determining whether a comparison between a position of the vehicle and the position of the transmitting vehicle indicate an error; and
triggering a recalculation of the position of the vehicle in response to determining the comparison between the position of the vehicle and the position of the transmitting vehicle indicate an error.

19. The processing device of claim 11, wherein the processing device is configured to control the vehicle based at least in part on the motion plan and the future behavior prediction by:
determining whether the motion plan is unsafe; and
sending a safety warning to the transmitting vehicle in response to determining the motion plan is unsafe.

20. The processing device of claim 11, wherein the vehicle behavior model for the transmitting vehicle is limited by the turning radius of the transmitting vehicle to constrain potential turning paths of the transmitting vehicle.

21. A processing device, comprising:
means for receiving an intention message including a motion plan from a transmitting vehicle,
wherein the motion plan comprises a trajectory of the transmitting vehicle and one or more vehicle descriptors associated with the transmitting vehicle and wherein the one or more vehicle descriptors comprise a vehicle physical capability,
wherein the vehicle physical capability comprises at least one of a turning radius, a vehicle top speed, and a vehicle maximum acceleration;
means for parsing the intention message to identify the motion plan for the transmitting vehicle;
means for determining an expected region of interest for the vehicle based at least in part on the motion plan;
means for selecting a first detection algorithm for detecting a sensor perceptible attribute of the transmitting vehicle based on receiving the motion plan of the transmitting vehicle,
wherein the first detection algorithm is associated with a first confidence threshold for reporting detection of the transmitting vehicle in the expected region of interest,
wherein the first confidence threshold is lower than a second confidence threshold associated with a second detection algorithm;
means for receiving sensor data from one or more sensors disposed in or on the vehicle;
means for applying the selected first detection algorithm to a limited subset of received sensor data from the expected region of interest;
means for setting a future behavior prediction for the transmitting vehicle based at least in part on a vehicle behavior model for the transmitting vehicle limited by the vehicle physical capability and the expected region of interest, wherein setting the future behavior prediction for the transmitting vehicle is based on the application of the selected first detection algorithm; and
means for controlling the vehicle based at least in part on the motion plan and the future behavior prediction.

22. The processing device of claim 21, wherein the one or more vehicle descriptors comprise the sensor perceptible attribute.

23. The processing device of claim 21, wherein means for controlling the vehicle based at least in part on the motion plan and the future behavior prediction comprises:
means for applying the first detection algorithm to the received sensor data at the expected region of interest to detect the transmitting vehicle in the received sensor data based at least in part on the sensor perceptible attribute.

24. The processing device of claim 21, wherein:
the first confidence threshold is fifty percent confidence threshold, and the first detection algorithm reports detection of the sensor perceptible attribute based on confidence of the detection of the sensor perceptible attribute being above the fifty percent confidence threshold; and
the second confidence threshold is a ninety percent confidence threshold, and the second detection algorithm reports detection of the sensor perceptible attribute based on confidence of the detection of the sensor perceptible attribute being above the ninety percent confidence threshold.

25. The processing device of claim 21, wherein means for controlling the vehicle based at least in part on the motion plan and the future behavior prediction comprises:
means for correlating vehicle detection sensor data with the transmitting vehicle based at least in part on the sensor perceptible attribute.

26. The processing device of claim 21, further comprising:
means for determining whether a behavior of the transmitting vehicle conforms to the future behavior prediction; and
means for updating the future behavior prediction based at least in part on the vehicle physical capability in response to determining that the behavior of the transmitting vehicle does not conform to the future behavior prediction.

27. The processing device of claim 21, wherein the one or more vehicle descriptors comprise a vehicle location attribute.

28. The processing device of claim 27, wherein means for controlling the vehicle based at least in part on the motion plan and the future behavior prediction comprises:
   means for determining a position of the transmitting vehicle based at least in part on the vehicle location attribute;
   means for determining whether a comparison between a position of the vehicle and the position of the transmitting vehicle indicate an error; and
   means for triggering a recalculation of the position of the vehicle in response to determining the comparison between the position of the vehicle and the position of the transmitting vehicle indicate an error.

29. The processing device of claim 21, wherein means for controlling the vehicle based at least in part on the motion plan and the future behavior prediction comprises:
   means for determining whether the motion plan is unsafe; and
   means for sending a safety warning to the transmitting vehicle in response to determining the motion plan is unsafe.

30. A non-transitory processor-readable storage medium having stored thereon processor-executable instructions to cause a processor in a vehicle to perform operations comprising:
   receiving an intention message including a motion plan from a transmitting vehicle,
   wherein the motion plan comprises a trajectory of the transmitting vehicle and one or more vehicle descriptors associated with the transmitting vehicle, and
   wherein the one or more vehicle descriptors comprise a vehicle physical capability that comprises at least one of a turning radius, a vehicle top speed, and a vehicle maximum acceleration;
   determining an expected region of interest for the vehicle based at least in part on the motion plan;
   selecting a first detection algorithm for detecting a sensor perceptible attribute of the transmitting vehicle based on receiving the motion plan of the transmitting vehicle,
   wherein the first detection algorithm is associated with a first confidence threshold for reporting detection of the transmitting vehicle in the expected region of interest,
   wherein the first confidence threshold is lower than a second confidence threshold associated with a second detection algorithm;
   receiving sensor data from one or more sensors disposed in or on the vehicle;
   applying the selected first detection algorithm to a limited subset of received sensor data from the expected region of interest;
   setting a future behavior prediction for the transmitting vehicle based at least in part on a vehicle behavior model for the transmitting vehicle limited by the vehicle physical capability and the expected region of interest, wherein setting the future behavior prediction for the transmitting vehicle is based on the application of the selected first detection algorithm; and
   controlling the vehicle based at least in part on the motion plan and the future behavior prediction.

* * * * *